(12) United States Patent
Geshwind

(10) Patent No.: US 6,507,872 B1
(45) Date of Patent: Jan. 14, 2003

(54) CLASS OF METHODS FOR IMPROVING PERCEIVED EFFICIENCY OF END-USER INTERACTIVE ACCESS OF A LARGE DATABASE SUCH AS THE WORLD-WIDE WEB VIA A COMMUNICATION NETWORK SUCH AS "THE INTERNET"

(76) Inventor: David Michael Geshwind, 111 Fourth Ave., New York, NY (US) 10003

( * ) Notice: Subject to any disclaimer, the term of this patent is extended or adjusted under 35 U.S.C. 154(b) by 0 days.

(21) Appl. No.: 08/483,205

(22) Filed: Jun. 7, 1995

Related U.S. Application Data

(63) Continuation-in-part of application No. 08/110,230, filed on Aug. 23, 1993, now abandoned, which is a continuation-in-part of application No. 07/951,267, filed on Sep. 25, 1992.

(51) Int. Cl.$^7$ ............................................. G06F 13/00
(52) U.S. Cl. ...................................... 709/236; 709/245
(58) Field of Search ................... 395/200.66; 370/474, 370/473; 709/236, 245

(56) References Cited

U.S. PATENT DOCUMENTS

| 4,649,473 A | * | 3/1987 | Hammer et al. ............ 709/314 |
| 5,519,704 A | * | 5/1996 | Farinacci et al. ........... 370/402 |
| 5,583,793 A | * | 12/1996 | Gray et al. ................. 709/223 |

OTHER PUBLICATIONS

G. Wrigley et al.; "Multi–Layer Operations Functional Analysis for Broadband ATM Networks and Services"; GLOBECOM '93: IEEE Global Telecommunications Conf.; pp. 1536–1542, Dec. 1993.*

* cited by examiner

*Primary Examiner*—Kenneth R. Coulter

(57) ABSTRACT

Procedures and systems for speeding up end-user access of large interlinked databases over communication networks such as the internet. Predicting user requests is accomplished by artificially intelligent assistant. These requests are prioritized and augmented protocols are used to download in a weighted interleaved fashion multiple information resources.

210 Claims, 10 Drawing Sheets

FIGURE 13: MULTI-CLICKABLE TREE NAVIGATION DISPLAY — CATALOG EXAMPLE

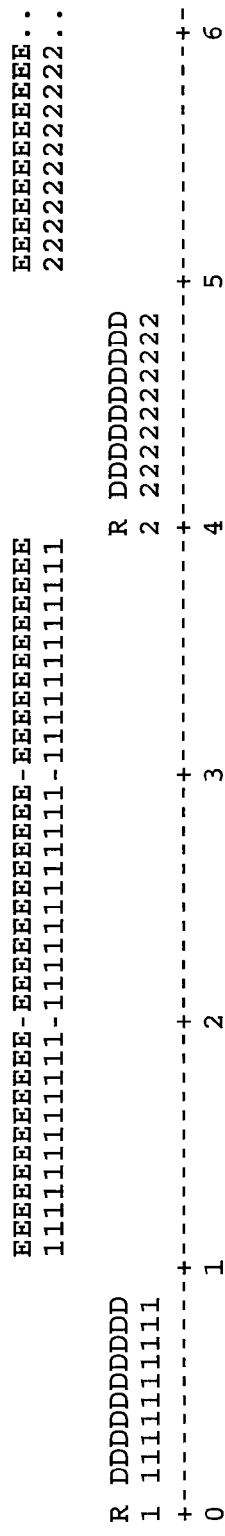
FIGURE 1: End User Communication Channel Usage Under a First Condition
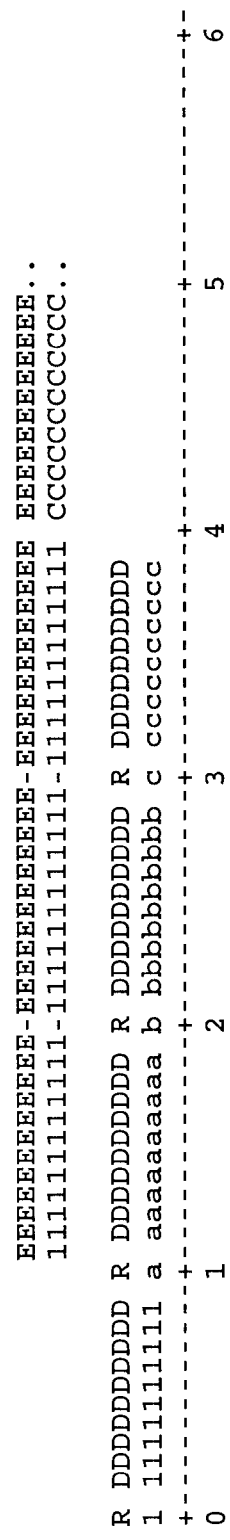
FIGURE 2: End User Communication Channel Usage Under a Second Condition
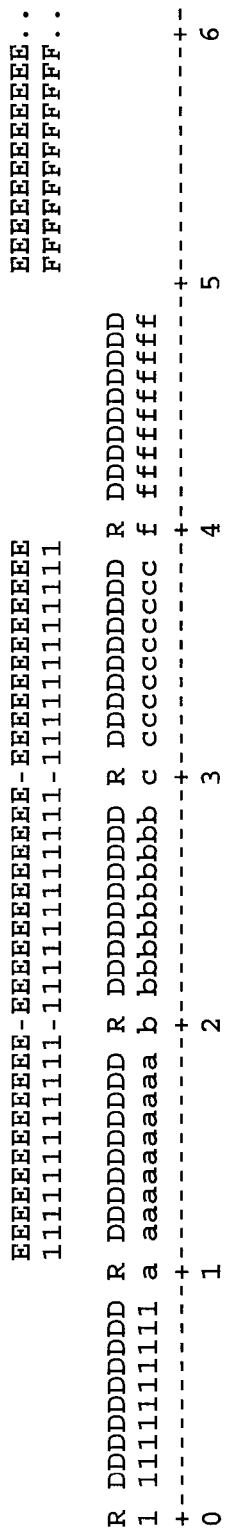
FIGURE 3: End User Communication Channel Usage Under a Third Condition

```
                         EEEEEEEEEEEE-EEEEEEEEEE  EEEEEEEEEE..
                         1111111111111-11111111111  ccccCCCCCCCC..
R  DDDDDDDDD   R    DDDDDDDDDDDDDDDDDDDDDDDDr  DDDDDDDDDDDDDDDDDD
1  11111111   a-f   abcdefabcdefabcdefabcdec   cccabdefabdefabdef
+-----------+------+---------------------------+------------------+
0           1      2            3              4        5         6
```

FIGURE 4: END USER COMMUNICATION CHANNEL USAGE UNDER A FOURTH CONDITION

```
                         EEEEEEEEEEEE-EEEEEEEEEE  EEEEEEEEEE..
                         1111111111111-11111111111  CCCCCCCCCCCC..
R  DDDDDDDDD   R    DDDDDDDDDDDDDDDDDDDDDDDDDDDDDDDDDDDDDDDDDDD
1  11111111   a-f   abccdefabccdefabccdefabcdefabdcefabderabdefabcdefabdef
+-----------+------+---------------------------+------------------+
0           1      2            3              4        5         6
```

FIGURE 5: END USER COMMUNICATION CHANNEL USAGE UNDER A FIFTH CONDITION

```
                         EEEEEEEEEEEE-EEEEEEEEEE  EEEEEEEEEE..
                         1111111111111-11111111111  ffffFFFFFFFF..
R  DDDDDDDDD   R    DDDDDDDDDDDDDDDDDDDDDDDDDDr  DDDDDDDDDDDDDDDDDD
1  11111111   a-f   abccdefabccdefabccdeff     ffffabdeabdeabdeabde
+-----------+------+---------------------------+------------------+
0           1      2            3              4        5         6
```

FIGURE 6: END USER COMMUNICATION CHANNEL USAGE UNDER A SIXTH CONDITION

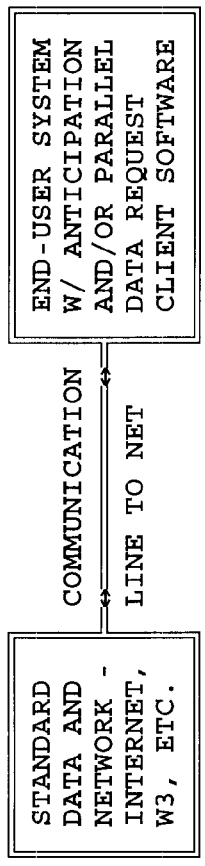
FIGURE 7: ANTICIPATORY AND/OR PARALLEL REQUEST CLIENT EMBODIMENT
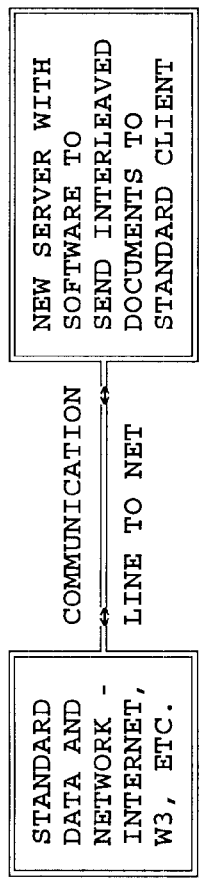
FIGURE 8: INTERLEAVED DOCUMENT SERVER EMBODIMENT
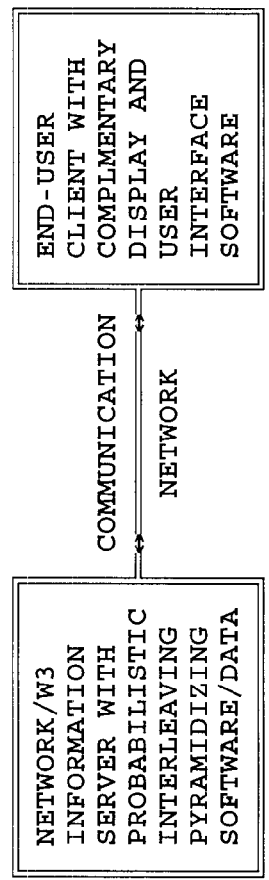
FIGURE 9: ENHANCED CLIENT/SERVER EMBODIMENT

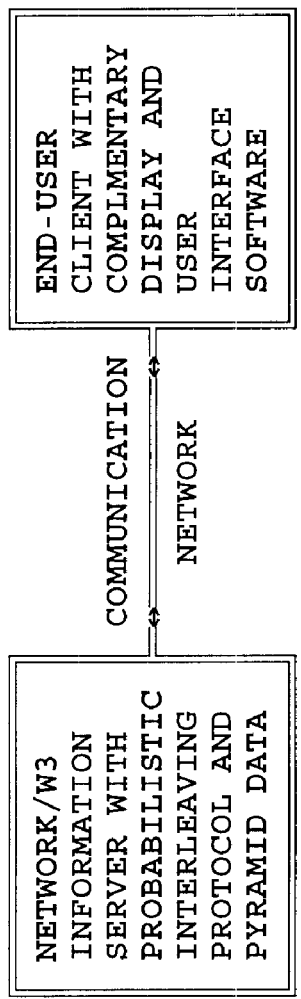
FIGURE 10: ENHANCED PROTOCOL EMBODIMENT
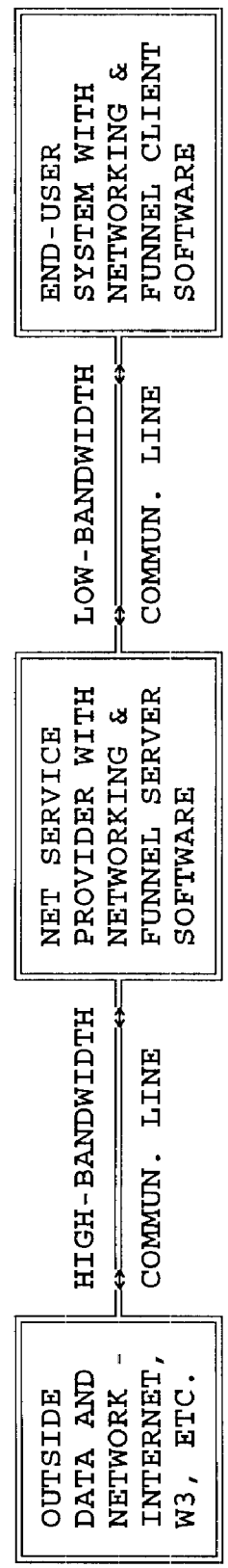
FIGURE 11: "FUNNEL" SERVICE EMBODIMENT

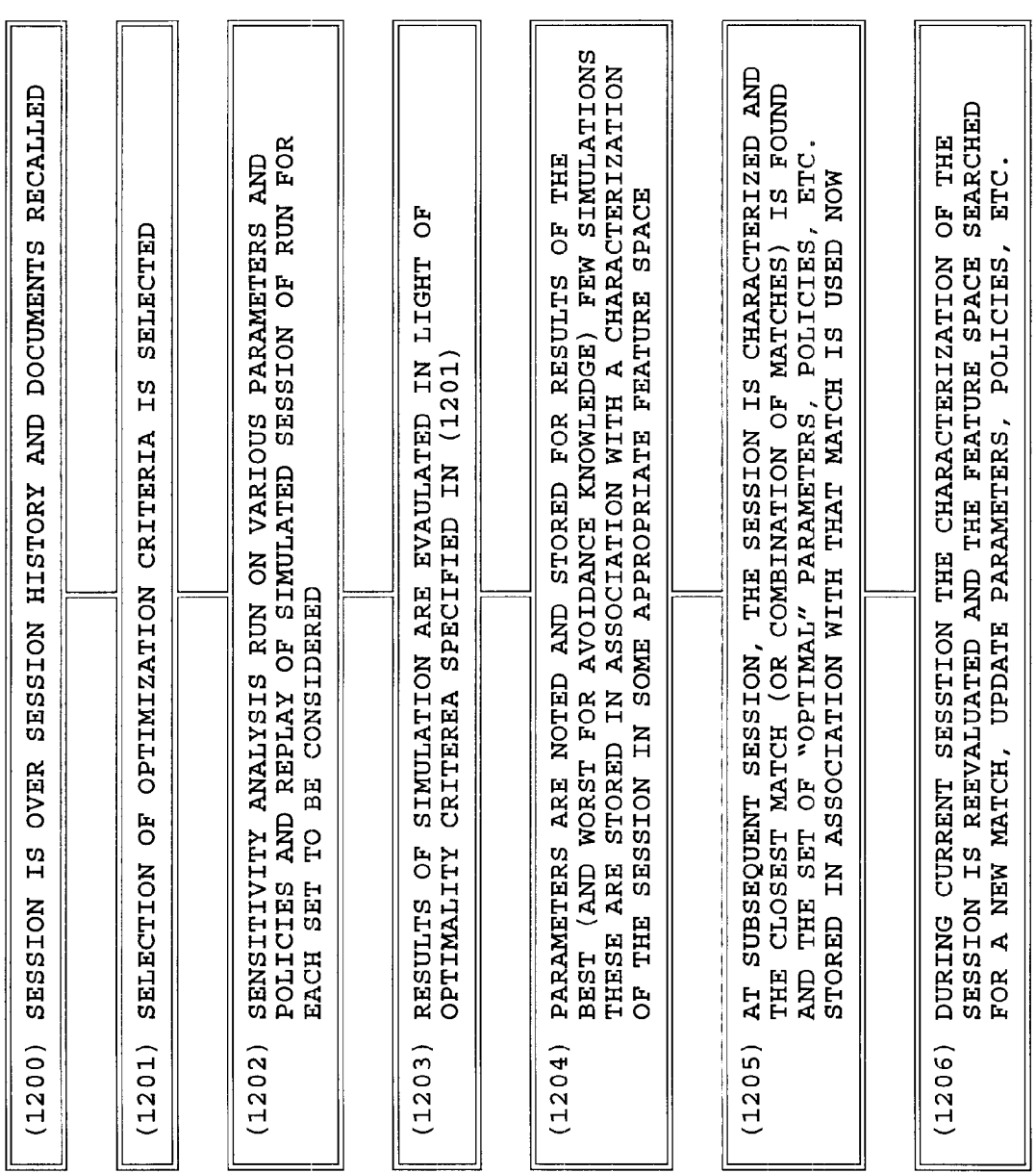
FIGURE 12: POSTMORTEM FINE-TUNING PROCESS

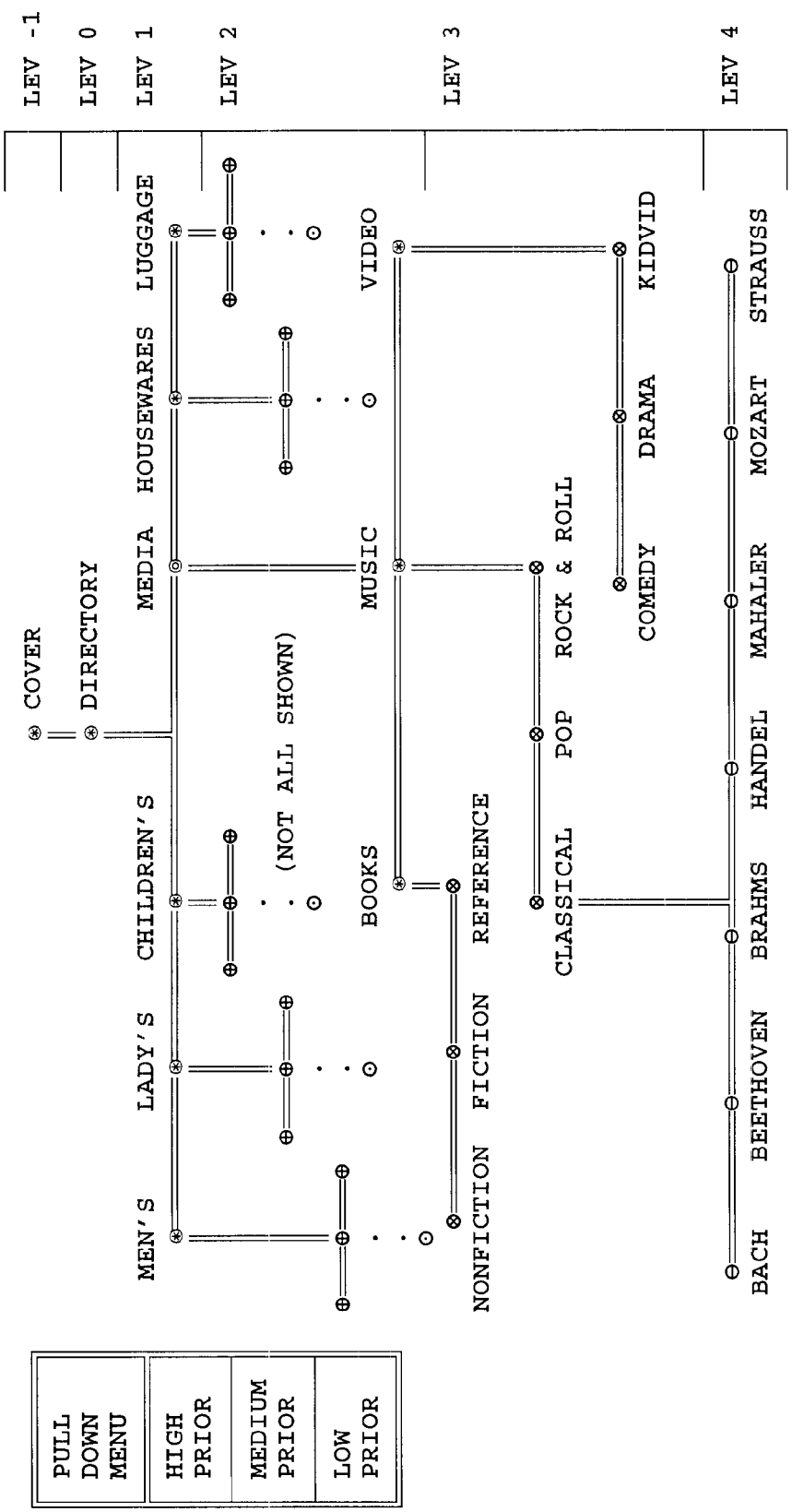
FIGURE 13: MULTI-CLICKABLE TREE NAVIGATION DISPLAY — CATALOG EXAMPLE

ONE METHOD: Sub-Packet Headers

| IP HEADER MACHINE ADDRESS | TCP HEADER SOCK\PORT & SEQ | MP 1 HEADER FIBR & SEQ-LEN/NO | DATA PACKET DELIVER TO: FIBR ORDER: SEQ SIZE IS UNIFORM OR: LEN LONG OR: NO OF UNIFORM CHUNKS - MICRO-PACKET 1 /N O | MP 2 HEADER FIBR & SEQ-LEN/NO | DATA PACKET DELIVER TO: FIBR ORDER: SEQ SIZE IS UNIFORM OR: LEN LONG OR: NO OF UNIFORM CHUNKS - MICRO-PACKET 2 /N O | MP 3 HEADER FIBR & SEQ-LEN/NO | DATA MICRO-PACKET (SUB-PACKET) 3 DELIVER TO: *FIBR* (FIBER) ORDER BY: *SEQ* (SEQUENCE) SIZE OF PACKET: OPTION A: ALL ARE UNIFORM OPTION B: *LEN* LONG OPTION C: *NO* OF UNIFORM "CHUNKS" FOR HIGH-PRIORITY FIBERS: OPTION A: MORE FREQUENTLY OPTION B: LONGER SUB-PACKET OPTION C: MORE "CHUNKS" IN A SUB-PACKET (IN THIS EXAMPLE MP 3 IS A LONG HIGH-PRIORITY SUB-PACKET) |
|---|---|---|---|---|---|---|---|

ALTERNATE METHOD: Map or Directory in Header

| IP HEADER MACHINE ADDRESS | TCP HEADER SOCK\PORT & SEQ | "MAP" OR DIRECTORY OF DATA USAGE EXAMPL FIB A 1 UNIT LOW PRIOR FIB B 1 UNIT LOW PRIOR FIB C 3 UNIT HIGH PRIOR HEADER | 1 UNIT OF DATA SPACE DEVOTED TO FIBER A A LOW-PRIORITY RESOURCE FIBER A DATA SUB-PACKET | 1 UNIT OF DATA SPACE DEVOTED TO FIBER B A LOW-PRIORITY RESOURCE FIBER B DATA SUB-PACKET | 3 UNITS OF DATA SPACE IS DEVOTED TO FIBER C, A HIGHER-PRIORITY RESOURCE FIBER C DATA SUB-PACKET |
|---|---|---|---|---|---|

FIGURE 14: MICRO PROTOCOL

| IP MACH HEADDER ADDRESS | MA CC PP HH EE AA DD EE RR SS | T C P H E A D E R | S O C K E T H E A D E R S E Q | MACRO-PACKET CORRESPONDS TO TCP PACKET<br>SOCKET ADDRESS A CORRESPONDS TO RESOURCE X<br>SEQUENCE NUMBER IS SAME FOR BOTH A & X |
|---|---|---|---|---|
| | | | A | |

| IP MACH HEADDER ADDRESS | MA CC PP HH EE AA DD EE RR SS | T C P H E A D E R | S O C K E T H E A D E R S E Q | MACRO-PACKET CORRESPONDS TO TCP PACKET<br>SOCKET ADDRESS B CORRESPONDS TO RESOURCE Y<br>SEQUENCE NUMBER IS SAME FOR BOTH B & Y |
|---|---|---|---|---|
| | | | B | |

| IP MACH HEADDER ADDRESS | MA CC PP HH EE AA DD EE RR SS | T C P H E A D E R | S O C K E T H E A D E R S E Q | MACRO-PACKET CORRESPONDS TO TCP PACKET<br>SOCKET ADDRESS C CORRESPONDS TO RESOURCE Z<br>SEQUENCE NUMBER IS SAME FOR BOTH C & Z |
|---|---|---|---|---|
| | | | C | |

FIGURE 15: MACRO PROTOCOL

| IP ADDRESS HEADER | MAC ADDRESS HEADER | TCP CHECKSUM HEADER AND SEQ | AUG FIBER HEADER A | AUGMENTED SUB-PACKET DATA FIBER A (NOT SOCKET N) CORRESPONDS TO RESOUCE A SEQUENCE NUMBER IS ASEQ NOT SEQ |
|---|---|---|---|---|

| IP ADDRESS HEADER | MAC ADDRESS HEADER | TCP CHECKSUM HEADER AND SEQ | AUG FIBER HEADER B | AUGMENTED SUB-PACKET DATA FIBER B (NOT SOCKET N) CORRESPONDS TO RESOUCE B SEQUENCE NUMBER IS BSEQ NOT SEQ |
|---|---|---|---|---|

| IP ADDRESS HEADER | MAC ADDRESS HEADER | TCP CHECKSUM HEADER AND SEQ | AUG FIBER HEADER C | AUGMENTED SUB-PACKET DATA FIBER C (NOT SOCKET N) CORRESPONDS TO RESOUCE C SEQUENCE NUMBER IS CSEQ NOT SEQ |
|---|---|---|---|---|

FIGURE 16: AUGMENTED PROTOCOL

```
A1 A2 A3 A4 A5                    LAYER ONE 2 1 B1 1 2 B2 B3                  LAYER TWO

A1 A2 B1 A3 B2 B3 A4 A5           LAYER ONE + TWO 1 1 C1 4 1 C2                     LAYER THREE

A1 C1 A2 B1 A3 B2 C2 B3 A4 A5     LAYER ONE + TWO + THREE
```

FIGURE 17: A SCHEME FOR DELTA-MODULATION-LIKE UPDATING OF DOCUMENTS

CLASS OF METHODS FOR IMPROVING PERCEIVED EFFICIENCY OF END-USER INTERACTIVE ACCESS OF A LARGE DATABASE SUCH AS THE WORLD-WIDE WEB VIA A COMMUNICATION NETWORK SUCH AS "THE INTERNET"

This application is a continuation-in-part of application Ser. No. 08/110,230, filed Aug. 23, 1993, now abandoned, which is itself a continuation-in-part of Ser. No. 07/951,267, filed Sep. 25, 1992.

This application is also a related application of application Ser. No. 08/483,202 filed Jun. 7, 1995, now abandoned. Both that related application and the instant application are continuations-in-part of Ser. No. 07/800,325 filed Dec. 2, 1991, now abandoned and Ser. No. 07/933,377 filed Jul. 10, 1992, now abandoned, which were a continuation-in-part and continuation respectively of Ser. No. 07/378,799, filed Jul. 14, 1989, now abandoned.

Inventor also references his European Patent Number EP 0144352B1. Inventor also references his U.S. Patent Disclosure Document Number 287539.

All of these documents (except for those abandoned) are hereby incorporated by reference.

TECHNICAL FIELD

The instant invention comprises a related class of methods, techniques and system designs for improving at least the perceived, if not the actual, efficiency of and end-user's interactive access of large (perhaps cross-referenced, cross-linked or "hyper-linked") databases, such as the World Wide Web, via a communications network, such as "The Internet"; and which can also be applied to the computerized access of local databases.

This document, to some extent, builds on inventive work disclosed by Inventor in earlier patent applications, issued patents, and disclosure documents, as well as during proprietary development. Where that earlier material is relevant it will, generally, be pointed out in the disclosure.

SCOPE OF INVENTION

Generally, the domain of the instant invention is an extant (generally packet-switching) communications network such as "The Internet". Alternately, the invention can be adapted, in a straight-forward manner, and applied to a locally accessible database. Such a network comprises a multiplicity of computers connected via a network over which information is sent: from a first program running on a first computer to a second program running on a second computer; by (if sufficiently large) breaking that information into a multiplicity of packets; and, "wrapping" each packet in addressing information that specifies at least its destination. The specification of how information is parsed, addressed, transmitted, received and reassembled are generally called communication protocols and include, on the internet, TCP/IP, UDP, FTP and HTTP; as well as protocols that permit an end user to dial-up a service provider's computer on the internet including SLIP, CSLIP and PPP.

The instant invention relates to a group of related methods for selecting and arranging information prior to its being submitted for distribution via the network and/or re-assembling the information after its being received at the destination. The network and its communications protocols operate on one or more levels below the operation of the instant invention and, thus, the instant invention may be considered a "meta-protocol" or higher level protocol.

The intended practitioner of the present invention is someone who is skilled in designing such networks and implementing the software that affects and/or utilizes these communication protocols within the environment of a particular operating system (e.g., UNIX). That is, one skilled in the art of this invention is capable of writing program code and/or utilizing and coordinating existing programs within a multi-computer environment. Examples of such related tasks would be the programming of software to implement: a communications protocol such as TCP/IP, UDP, FTP, HTTP, SLIP, CSLIP or PPP; or, an application that utilizes such a protocol, such as an information providing server (e.g., an EMail distribution program, or an FTP or World Wide Web site) or information requesting and receiving client program (e.g., a user EMail program or Web Browser). Many of these capabilities or programs are provided as part of operating systems (e.g., UNIX) and such practitioners are knowledgeable about and skilled in implementing the internals of such operating systems. Often they are referred to as system programmers or software engineers.

Those skilled in the art know how to accomplish such tasks as to: coordinate and pass information between programs operating within a single computer or on several interconnected computers; initiate requests for local or remote information or database searches; and, generally, to accomplish these tasks by utilizing services provided by operating systems, communications packages and protocols, and other application programs. The details of accomplishing such standard tasks are well known and within the ken of those skilled in the art; are not (in and of themselves) within the scope of the instant invention; and, will be referred to but not described in detail in the instant disclosure.[1]

Rather, what will be disclosed are novel higher-level methods, system designs and information arrangements, which rely and build upon those known and understood processes. Disclosed will be what one skilled in the art will need to know, beyond that with which he is already familiar, in order to implement the instant invention.

The above discussion relates to the instant invention in general. However, certain aspects of the instant invention comprise elements including database searching, statistical simulation or artificial intelligence (e.g., learning software and neural networks). Similarly, those skilled in these specialized areas of computer science are well versed in the details of those fields; and, generally, those details are not the substance of this invention. Rather, the disclosure will point out the specific elements of the instant invention to which the standard practices of those fields are to be applied; or, specifically how the standard practices are to be modified to practice the instant invention.[2]

In summary, the disclosure of the instant invention will focus on what is new and novel and will point out, but not repeat the details of, what is relevant of that which known in the art.

BACKGROUND AND PRIOR ART

This invention is disclosed in an technological environment that already includes, without limitation, large packet-switching communication networks, such as "The Internet", and large interconnected databases, such as the World Wide Web (WWW). Much of the disclosure will be cast as relating specifically to accessing the WWW on the internet; however, references made to "The Internet" or "internet" may be considered to apply to any similar data network (as well as to the process of accessing a local database) and references made to the WWW may be considered to apply, generally, to any type of local or remote, distributed or coherent, database. The WWW has been chosen as an example because of its complexity as a hypermedia database (which comprises text, images, sound, etc.) which is interconnected and distributed in nature; and, also, because of the current interest in, and increasing usage of, this particular database.

In addition there are many extant programs and mechanisms for accessing and initiating computer mediated searches of such databases. For example, gopher, WAIS, archie, veronica, web browsers (including Mosaic and Netscape).

Communication between various computers on the internet (and computer programs running on those computers) is affected by various communication protocols, including TCP/IP, FTP, UDP, HTTP, SLIP, CSLIP, PPP, etc.

There are already extant many programs and techniques for: running computer simulations and analyses of systems such as communication networks; compiling and analyzing statistics, including sensitivity analysis; and artificial intelligence techniques such as complex searching algorithms, programs that learn or train, can recognize patterns, neural networks, etc.

Lastly, there are a large number of service providers who will make available to users, who have personal computers or workstations, a connection via modem over a dial-up telephone line (or ISDN or dedicated line) through their computer to the internet. However, accessing, searching and browsing the WWW through such a provider can be a painfully slow process.

THE PROBLEM TO BE SOLVED—IN BRIEF

As explained, above, the process of "surfing the Web", let alone trying to accomplish serious work, via the internet can often be a slow and frustrating process; especially if accessing via a modem through a service provider but, often, even if directly connected to the internet. Periods of being flooded with information may alternate with long stretches of waiting for information to arrive.

As working, playing or just browsing over communications networks, via digital computers, become ubiquitous, the number of users, number of "sites", and the shear bulk of data being accessed, is growing exponentially.

The introduction of graphical or hypertext document systems (such as the HTML language, the HTTP protocol and browsers such as Mosaic) to the Internet, and the transformation of that network into the World Wide Web (WWW), have tremendously increased the requirements for bandwidth: both because of the increased requirements of graphic (or even video and audio) components of documents, "pages" and files; and, because this richer, multimedia content is attracting users beyond a threshold where the commercial potential becomes obvious. This, in turn, prompts more "information providers" to take the plunge, increasing the size of the browsable pool of content, and a positive-feedback spiral results.

The increasing demands for raw bandwidth and "network infrastructure" are creating a technical and logistical problem which is, on the other hand, perhaps an economic and business boon. The class of inventions described herein will likely only exacerbate this situation, as will become clear later.

Rather than being directed toward reducing requirements for bandwidth—i.e. traditional bandwidth reduction—these techniques are designed to increase the performance, efficiency and value of the work that can be done using whatever level of such communications technology is available. That is, the goal here is not to reduce the size of the channel needed, but to—apparently—squeeze more information down the available user channel.

This is similar to an approach used in Inventor's invention which is subject of U.S. patent application Ser. No. 07/077, 916 where Inventor states:

The goal of most bandwidth compression schemes is to "squeeze" a given information signal into a smaller channel. A main goal of the instant invention is to "squeeze" a larger picture into a given channel. Although this may at first sound as a semantic difference only, there is a significant practical difference.

Broadcast television in the U.S. is a "given channel" that is unlikely to change for the foreseeable future. Bandwidth compression schemes that would allow the use of a smaller transmission channel and require complex decoding at destination could not be used with the many millions of existing home receivers.

Similarly, most users are tethered to communications networks via telephone dial-up lines and modems which—although, in general, modems get better and higher-bandwidth telephone service is becoming available—for any given user, at any given time, are limited and usually not sufficient for the user's desires. That is, working over a communications network is usually perceived as slower than working locally (or over a high bandwidth network, such as a Local Area Network or ISDN or T1 digital telephone line).

However, whatever the given network connection, these techniques can be used to advantage to increase actual or perceived performance (of work, if not strictly of bandwidth) for many types of work done over such networks.

In particular, searching or browsing through large amounts of information (cohesive databases, distributed masses of information such as the WWW, or otherwise) is a task that often goes in fits and starts. The user makes some decision about what is desired and makes a request for more remote information: as a formal database search request; by clicking on a "link" on a WWW page; or otherwise. The user then waits for the information to be delivered to his local screen. During this period the user often sits idle. The user then reviews the new information. During this period the local computer and communication line often sits idle. And so on.

The goal here, then, is to: speed up the overall process and make it more efficient; make the user feel that the process is more immediate and valuable; shorten work time; or, alternately, get more done in the same time.

CONCEPTUAL ORIGINS

In an early stage of the development of the techniques described herein, Inventor recognized that: remote computer databases that are searched for professional purposes are becoming more widely used, particularly in the legal, engineering/scientific and medical fields. Further, the amount of data to be down-loaded is increasingly large.

Communications and on-line costs are now often a significant part of the cost of doing business. Efficient use of communication and database search facilities is therefore desired.

We have developed a group of related techniques (technical details are described below) that will make more efficient use of the open communication line, saving money.

These will also speed the search procedure, saving the working time of the lawyer or other professional using the system, which professional time is much more valuable than communications time.

These techniques will also be useful for local searching of databases contained on magnetic disk or CD-ROMs.

A narrative example is as follows: A lawyer has requested from a remote database, and is reviewing on screen, a particular legal case. In the most simple embodiment, all cases referred to by said case would be retrieved by the remote computer and initial sections (pages or paragraphs for example) of each case would be transmitted to the lawyer's workstation. In this way when the lawyer was ready for a next case, it is highly likely that some of that material would already be available at the lawyer's station for review. As soon as a selection is made by the lawyer, transmission time is wholly devoted to that selection rather than multiplexed between multiple potential selections. The relative amounts transmitted of each potential selection, and the list of potential selections, can both be modified by factors such as: the length of each document; statistical "knowledge" of the lawyer's prior access to that particular document; statistical "knowledge" of the lawyer's prior access to that type of document; document dates; search of abstracts and key words; prior statistical knowledge of lawyer's work style; and other factors.

SUMMARY OF INVENTION

As explained, above, communication while accessing remote databases over the internet often runs in fits and starts; the communication channel is often left fallow. [At least the communication line between a service provider and an end user; the communication line between the service provider and the internet, in general, may be in more uniform use, serving many users simultaneously.] The intent of the instant invention is to make use of that fallow time and, thereby, improve the perceived (if not actual) responsiveness and efficiency of the network to the user's demands.

A specific deficiency that arises when accessing WWW "pages" is that each page consists of a text script and, optionally, a number of associated image or other multimedia resource files. A separate communication connection (a logical data construct, not a physical wired connection) is established, used, and then broken down for the delivery of the script and each resource. This use of a multiplicity of connections results in a significant amount of overhead and delay. One element of the present invention will be to establish and leave extant a communication connection that will survive the delivery of a single file, and which can be used not only for delivery of all the resource files comprising a document or "page", but for the delivery of multiple documents from the same source to the same destination. This technique, in and of itself, may not constitute inventive matter; however, the composite method, which this and related techniques comprise, and new uses to which they are put, are.

Similarly, it is standard that an end user's client program (that program which permits the user to "browse" and which initiates system requests for information resources) permits a single request to be made, waits for the requested information to be delivered, and then waits further while the user reviews the delivered item and decides what to do next. Only then is the user permitted to make a next request. In the instant invention multiple, parallel requests will not only be permitted, but in some embodiments the system will make those multiple requests in anticipation of user requirements.

Again, this technique, in and of itself, may not constitute inventive matter; however, the composite method, which this and related techniques comprise, and new uses to which they are put, are.

The more substantive elements of the present invention comprise the following:

1. The interleaving or time-division multiplexing of multiple data resources (generally, files) into a single (or at least composite) communication stream of information, by fragmenting the resources into portions and interleaving those portions.
2. The weighting of the presence of the individual data resources within the composite information stream by modulating the size and/or frequency of representative portions to be included.
3. Attempting to anticipate the user's likely future requirements on a "predictive probabilistic" basis. Further, the flexible and/or artificially intelligent adjustment or customization of the algorithms that predict and determine the interleaving weights for a particular user.
4. Determining and updating the interleaving weights (2) based on the anticipation (3) and actual events.
5. The "pyramidization" of data resources in such a way that a partially delivered data resource is, at least, of some use to the end user; perhaps, if only, to evaluate whether the balance of the data resource is required.

These five elements will be disclosed in more detail below, as will their integration into a class of methods and protocols that will permit more efficient usage of communication networks by end users. In particular, new communication protocols and methods will be disclosed that function: as a layer above existing protocols; as a layer below existing protocols; as addons or extensions to existing protocols; or, as entirely new protocols or methods.

Further, it will be disclosed how to apply these new methods to a number of different system architectures. Thus, a group of related embodiments will be disclosed which can be appropriately applied to different situations. Not all of these variations will embody each of the above elements to the same degree, if at all.

BRIEF DESCRIPTION OF DRAWINGS

FIGS. 1–6 depicts end user communication channel usage under various conditions.

FIG. 7 depicts an anticipatory and/or parallel request client embodiment.

FIG. 8 depicts an interleaved document server embodiment.

FIG. 9 depicts an enhanced client/server embodiment.

FIG. 10 depicts an enhanced protocol embodiment.

FIG. 11 depicts a Funnel service embodiment.

FIG. 12 depicts a postmortem fine-tuning process.

FIG. 13 depicts a schematic diagram of a multi-clickable tree navigation display (catalog example).

FIG. 14 depicts a micro protocol.

FIG. 15 depicts a macro protocol.

FIG. 16 depicts an augmented protocol.

FIG. 17 depicts a scheme for delta-modulation-like updating of documents.

END USER COMMUNICATION CHANNEL USAGE UNDER VARIOUS CONDITIONS

Referring, now, to FIGS. 1 through 6 (reading from top), a six minute interval during an end user's interaction with the WWW is depicted, in a schematic fashion, under various conditions. These figures are simplifications and exemplary in nature. They are being presented to better explain how several of the inventive elements, introduced above, can be applied to increase the efficiency of end user interaction with the network.

FIG. 1 (top) shows the standard situation where, in response to an end user action (e.g., specifying the designation for a WWW site home page) the system requests (R, at time zero) a first page (1). About ten seconds elapse before the network begins to deliver page 1, which delivery (D/1) continues for another 50 seconds being complete at 1 minute. The user has waited for a full minute of "thumb-twiddling" and, at that point, takes three minutes to examine (E) the information on that first page (1) and decides to link (by clicking on a highlighted word or icon, denoting hyperlinks to additional pages elsewhere on the network) to a second WWW page (2). In this case this choice of a second page was made from among six possible (a, b, c, d, e or f) secondary pages. The system then requests (R, at time 4 min.) the second selected page (2). About ten seconds elapse before the network begins to deliver page 2, which delivery continues for another 50 seconds being complete at 5 minutes. End user then examines (E) the second page (2).

FIG. 2 (second from top) shows that, in response to an end user action (e.g., specifying the designation for a WWW site home page) the system requests (R, at time zero) a first page (1). About ten seconds elapse before the network begins to deliver page 1, which delivery (D/1) continues for another 50 seconds being complete at 1 minute. The user has waited for a full minute of "thumb-twiddling" and, at that point, takes three minutes to examine (E) the information on that first page (1). However, during the three minutes that end user is examining page one, the system notes that page one has six potential hyperlinks to pages A, B, C, D, E and F and, in a serial fashion, begins to request those pages from the network. Each request takes one full minute (10 seconds to request (R) and 50 seconds to deliver(D)) and by the time end user has made a decision, three minutes later, the first three of those pages (A, B & C) have been requested and delivered. Thus, when end user "clicks" on the hyper link to page C, the network's response is apparently instantaneous—a vast (100%) improvement over the situation shown in FIG. 1.

FIG. 3 is identical to FIG. 2 except that, when end user makes a decision, it is to click on the link to page F instead of page C. Since page F has not yet been downloaded, a request goes out at the four minute mark and, by the five minute mark, the page is delivered with performance no worse than was exhibited in FIG. 1.

In both FIGS. 2 and 3, the system is employing a simple embodiment of the inventive element of predictively anticipating the end user's future requirements. In FIG. 2, the system succeeds in its prediction and greatly improves response time; in FIG. 3 the system has failed and responds no worse than in the standard situation. However, we would like to improve performance in all cases.

In FIG. 4, another inventive element is added and the requests (R) for all six pages (a–f) go out to the network simultaneously (or, at least in very quick succession) in parallel, and packets from all six pages begin to arrive soon after and continue to do so. The specifics of internet communication protocols (e.g., TCP/IP) permit the packets from each separate page to be identified and sequenced. At the four minute mark, end user makes a decision (again, page C but, in this case the results will be the same for any of the six pages) and the information for page C is already half there, indicated by (c). At that point (4 min.) the end user's system requests (r) the service provider's computer (or in other embodiments, the network or information provider) to now focus all available communication bandwidth to forwarding remaining packets of page C (c). [Affecting such a request and response is not part of the standard capabilities of internet operation and will be explained in greater detail below.] Since each page's delivery over the network takes approximately one minute (in this simplified schematic example) by the four minute mark all of the packets for all of the pages will likely already have arrived at the internet service provider's computer, and be awaiting delivery, via modem, to the end user's computer. It takes about an additional 20 seconds to download the remaining packets for page C from the internet service provider to the end user.

Thus, at the 4:20 mark page C is completely there. At worst, performance has improved over the standard situation by more than 66%. The advantage here (over the case in FIGS. 2 & 3, where performance is improved either 100% or 0%) is that the 66% improvement is achieved no matter which of the six pages are selected. The worst case wait is 20 seconds where, previously, the worst case wait was a full minute (even though the best case was no wait at all). Generally, the perception of system performance is tied to worst case. That is, always waiting about a half minute will be perceived as less annoying than waiting a full minute half the time and not at all half the time; even though the average wait is the same (in fact, the average is :30, more than the :20 here).

Further, since more than half of page C is already there (at time 4:00) with zero wait, an additional inventive element permits the first part of the file to be displayed while the balance is still in transit. Thus, effective performance can still be perceived as zero wait, or 100% improvement because, by the time the end user progresses through the document beyond the half-way mark, the complete file will, in all likelihood, be available. Document "pyramidization", an additional inventive element described in detail below, can increase the perception of performance further, by reordering the information in the document in order to make a partial delivery more useful, especially for making decisions such as "whether to wait for the completion of the document" or "which page to link to next".

FIG. 5 depicts an additional inventive element. Previously, the "prediction" was uninformed; all potential choices were treated as equally likely. In FIG. 5, "probabilistic prediction" and weighting of the interleaving are added. Based on some inference (e.g., the displayed words associated with the hyperlink to page C match some entry in a list of key words that the system has on file associated with subjects of interest to this particular user) that page C has a higher probability of being what the end user will select, the number of packets devoted to page C is doubled, compared to any of the other five pages. Thus, when C is selected, it is already there, complete.

FIG. 6 depicts the same situation as FIG. 5 but, in this case, the prediction was off and page F was selected. Performance in this case is approximately the same as for any page selected in the case depicted in FIG. 4; the maximum wait till completion is :25, an approximate performance increase of about 58%; but a perceived performance increase of up to 100% with partial display or "pyramidization".

EMBODIMENTS FOR VARIOUS SYSTEM CONFIGURATIONS

Depending upon where, within the network, the inventive techniques may be applied, there will be different embodiments. These are depicted in FIGS. 7 through 11. When the computer(s) collaborating on the invention are few, the inventive embodiments are similarly limited, when the improvements are system wide, the most capable and flexible embodiments result.

In particular, FIG. 7 shows a minimal embodiment where the client software, running on the end user system, contains the only inventive elements, and these are, thus, limited. The client attempts to anticipate potential user requirements and requests delivery of those resources, during fallow communication time, while the user is examining prior information. These may be requested serially, as shown in FIG. 2 or in parallel, as shown, for example, in the early part of FIG. 4. Since, in this embodiment, the invention resides solely in the client software, the interleaved reception of packets from parallel requests will be haphazard, at the variegations of network traffic. Further, the shift in transmission, depicted at time 4:00 in FIG. 4 cannot be counted upon as being possible.

FIG. 8 shows another minimal embodiment where the information provider server software, running on the computer "at the opposite end" of the network, contains the only inventive elements, and these are, thus, also limited. The server attempts to anticipate potential user requirements in an uninformed way, as best it can, and starts delivery of those resources, in addition to that which was requested, in response to a simple request for the "tip of the iceberg". This approach will be disclosed in greater detail later herein.

FIG. 9 depicts a situation where both the client and server software share complementary inventive elements, with much improved performance. However, in general, other computers on the network are unaware of the invention and, as will be disclosed in greater detail later, this enhanced "meta-protocol" operates within the confines of existing communication protocols. Thus, while specific client/server pairs may operate in an enhanced mode, such operation cannot be counted upon to be generally available.

FIG. 10 depicts a situation quite similar to FIG. 9. The difference here is that the entire network is made "aware" of the inventive techniques by the adoption of a novel or enhanced communication protocol. In that case, enhanced operation may, generally, be expected; and, further other computers which pass the communication up and down the network can be counted upon to help.

FIG. 11 depicts an embodiment (called THE FUNNEL™ by Inventor) where an enhanced client program running on an end user's system, and an enhanced communications utility running on a service provider's computer, collaborate to provide performance approaching that available from either of the two prior embodiments, although the various information provider's server computers run standard software and use standard communication protocols. As will be explained more fully below, with this embodiment overall network bandwidth used by the information provider and service provider servers, on behalf of the end user, may increase significantly, in order to make modest additional use of the end user's communication line; but, this will provide marked improvement as far as the end user is concerned.

INTELLIGENT ASSISTANT

The enhanced communication protocol technology disclosed herein will, to a great extent, be made useful by an "Intelligent Assistant" program that will anticipate a user's potential needs for information. That assistant will search ahead looking for potential information resources to download. It will then make probability assessments based on the document in question, what is currently being looked at, the stated and "inferred" goals of the current work session, the stated and "inferred" general goals and work style of the user, etc. Next the assistant will initiate parallel requests for multiple information resources and will weight the amount of available bandwidth that should be applied to each request based on the probabilistic assessment made previously.

In this way the access to the fallow communication link capacity which is made available through the novel (parallel and weighted) communication protocols can be put to optimal use by the intelligent assistant program while the user is otherwise engaged.

Further, by analyzing its performance, and tracking the user's habits, the intelligent assistant will continually increase its performance and keep from becoming outdated.

Extensive discussion of how these techniques can be applied will follow below; however, first, the techniques will be described.

Probability Assessment:

As will be described in much detail below, probabilistic assessments may be made for many documents, by matching keywords and other elements of documents, and many other techniques. These processes are controlled by a complex and sophisticated set of options, parameters and policies. These, in turn determine how the probabilities will be calculated and what policies determine how weights will be set for various document types, specific documents, or pyramidal levels. For example, a document with a high probability may still be given a low priority if it is of a particular type (say an image).

Whichever these mechanisms are chosen to be implemented (and, details of choices are presented below) the important aspect to consider here is that the mechanisms are very flexible due to the many parameters, choices and policies that may be combined with the various "search and match" mechanisms that add up to a probability assessment.

Post Mortem:

After each session the intelligent assistant will perform a "post mortem" or "Monday morning quarterback" type analysis of the session.

This will consist of running a simulation of the session, over and over, with the various parameters being adjusted for each simulation. The goal, by whatever searching and pruning techniques are applied, is to find (as best as possible or, at least, reasonable) what would have been the best parameters and policies to have implemented in the prior session in order to optimize performance.

What constitutes optimize is another matter entirely. That is do we wish to minimize the average wait time, minimize the maximum weight time, shorten the work session, etc. These are a matter human choice and it will be assumed here that some preferred measure of performance has been chosen by the user.

A "simulation" will consist of re-playing the session. A history of the session and documents being kept by the system for this purpose and then, if the documents have not been tagged as to be saved, by the user, they will be discarded. For each simulation the parameters and policies will be adjusted and the system will calculate the various times to download documents (based on the data kept from the actual session history) with different weights and policies in effect. It will then match what documents "arrived" and when, and match these against which documents the user actually decided to look at (as well as how long he looked at them, if he kept the document, if he used it to make another "hyperlink" jump to another document, etc.). In this way the machine may construct a simulated work session and determine how much and when the user would have been without whatever he needed.

Whatever optimal criteria will then be applied to come up with a figure of how convenient or inconvenient the session would have been with the particular policies and parameters in effect.

A "sensitivity analysis" will then be run on the various parameters to see which effect the session positively or negatively; alone or in combination.

Then, the system will keep in its long term storage the results of this sensitivity analysis in association with a characterization of the work session in some feature space (e.g., what type of work was being done; how did the user "feel" (or at least reported he felt); what types of documents were accessed; how active was the user, how continuously was he working; how long was the session; what types and amounts of information was kept vs. discarded; etc. etc.).

Then, the next session the machine will determine a characterization for the current session (which can be continually updated during the session) and try to match that characterization to the characterization of other sessions in feature space. For such a task artificial intelligence techniques including pattern recognition and neural networks are well suited.

The system will then chose the parameters and policies that are associated with the closest match in feature space (or, may combine parameters and policies from several partial matches is there is not a close match).

However, the system will,. of course, be programmed to give override priority to explicit user requests. For example, if the user selects from a menu that he wants pictures with his data today, the system will not deny him just because it will speed up the session. However, the system will, in fact, be programmed to "suggest" such a course of action. [However, it will also be made possible to suppress such suggestions, in order to prevent user agitation.]

The above method may be combined with the method of the intelligent edge creation (a system that "watches over the shoulder of the user") disclosed in Inventor's earlier patent application. The combination will provide a trainable intelligent assistant shell that can be applied to many applications where computers and humans interact on a repeated basis.

What follows are descriptions and a number of narrative examples of how the parameters, policies, probabilities and weights may be determined and utilized. See FIG. 12 for a flow diagram of this "post-mortem simulation" technique.

PROBABILISTIC PYRAMIDAL INTERLEAVING

Emulsification of BLOBs:

The section CONCEPTUAL ORIGINS, above, outlines a process that Inventor calls "Emulsification of BLOBs". A BLOB is (someone else's) acronym for a Binary Large OBject—that is, a large binary file that can be a large text document or, as is common now, a file or document that contains graphics, sound, video or other multimedia or high-volume components.

As was described, in the previous section, a number of files—or BLOBs—are interleaved for transmission (multiplexed). The present Inventor has been working for some time with novel ideas for interleaving and/or multiplexing signals, dating at least back to the mid-1970s and an audio gaming project.

A process in physics where blobs of oil are dispersed in water (or with two other immiscible liquids) is referred to as emulsification. The blobs are broken up and a uniformly mixed fluid, containing bits of material from all the blobs, suspended in the other medium, can be smoothly poured.

By analogy, bits (only informally, the file "chunks" likely being larger than a single bit) of many different BLOBs will be interspersed in the digital transmission medium so that a "smoothly mixed information fluid can be poured" down a transmission channel.

In a "naive" version, the amount of information interleaved from each file would be the same: e.g., the first 8 bytes from file 1, followed by the first 8 bytes of file 2 . . . followed by the first 8 bytes from file N, followed by the second 8 bytes from file 1, etc. In a, perhaps slightly less naive, alternative the chunks might be weighted by the length of the file: e.g., the first 1% of file 1, followed by the first 1% of file 2 . . . followed by the first 1% of the file N, followed by the second 1% of file 1, etc. In this way, information from all the files being transmitted run out approximately at the same time.

Neither of these schemes take into account what Inventor calls Probabilistic Predictive Weighting.

Probabilistic Predictive Weighting:

With the above two examples, the size of portions, taken from a multiplicity of files to be interleaved, were: a) fixed in absolute uniform size; or, b) fixed in a size proportional to the size of each file.

A second major component of the present group of inventive techniques comprises techniques for weighting the size of portions to be interleaved.

First, each file can be given a base portion size, or weight, of 1 unit. And this can be of the absolute or proportional type.

Next, the weight (i.e., portion size, or frequency of inclusion of portion) can be adjusted, in a straightforward or "unintelligent" fashion, depending upon known factors. For example, graphic images can be given precedent because of their, generally, larger size compared to text files. Or, the exact opposite conclusion can be reached because graphic files generally take much more bandwidth than text but yield less equivalent information. By cliche, a picture may be worth a thousand words, but it is often possible to hold tens or hundreds of thousands, or even millions, of words in the same file space. Other straightforward policies can be made on similar, or other unrelated, bases.

However, more important (or at least more inventive) other factors can be used to adjust the interleaved weighting factors for files; and, these can be updated and adjusted on an on-going basis during a session.

The basic idea is that while a particular item of information is being reviewed by the user, the system will be making a best guess at which several items the user may be interested in accessing next. These multiple items will then be downloaded in interleaved fashion and the weights continually updated so that, stated simply: at any given time, there is the greatest likelihood of the most information required next, being correctly anticipated and delivered, or at least in the process of being delivered.

Weights can be adjusted depending on: a) file size (as described above); b) file type (also, touched on above); or, c) an estimated probabilistic prediction of the likelihood of the particular item being later required by the user (described following).

The general principle for Probabilistic Predictive Weighting is to weight more heavily (i.e., increase the size or frequency of included portions) from files that are more likely to be (i.e., have a higher probability of being) the (or, at least, one of the) next item that the user will want to access. In this way, the expectation can be increased of having more of what will be needed next already downloaded before it is even requested. Thus, apparent instantaneous response can be achieved.

Once an item is actually selected for viewing by the user, its weight is increased (perhaps, but not necessarily, getting all of the available bandwidth) so that the completed document will be available ASAP or, at least, sooner.

The probability estimates can be made based on the interaction of several factors. Each file can then be given a composite probability index, perhaps with the sum of the indexes being normalized for a total of 1 unit or 100%. The relevant factors can interact in a non-trivial way and elements of Artificial Intelligence (AI) can be applied. Related AI-enhanced user interfaces have been described by others; and also by Inventor, for example, in his U.S. patent application Ser. No. 07/435,487, now abandoned, and Ser. No. 07/227,403 since issued as U.S. Pat. No. 4,925,294, which are hereby incorporated in their entirety by reference.

The basic factors include a straightforward or more "intelligent" assessment of:

a. The to be weighted document's size, type and particularly its content or other associations;

b. The currently viewed document's content and relationship or linkages to the weighted document(s);

c. The user's stated goals, work style, and session "profile" as stated by the user;

d. The system's own historical/statistical assessment of the user's "profile" or habits and activities, and the content, linkages and relationships of documents accessed by the user, during the current session; including the content, linkages and relationships of prior documents in the current session;

e. The user's general work habits, preferred work style, and "profile" as stated by the user;

f. The system's own historical/statistical assessment of the user's general "profile" or habits and activities, and the content, linkages and relationships of documents accessed by the user, in earlier sessions; in particular, an assessment must be made of the type of earlier sessions (documents) and the relevance of those earlier sessions (documents) to the current session (document).

Note that the term document as used above may be taken rather loosely and can refer to an entire file or coherent document (text or multimedia) in the usual sense; part of such a file/document, divisions being made on the basis of sequence, content type, format type, media type, etc.; a monomedia graphic, video, sound or text file; a "page", "card", or other subdivision of a linked hyper-media or multimedia document; a W3 page; a referenced or linked document of any of the types above, etc.

The above 6 factors were stated in rather abstract fashion. In the interests of clarity, some concrete, specific and/or narrative examples of each type, and of some of the complex interactions between types, will follow. All of the "policy" type issues mentioned can be explicitly specified by the user, or can be "statistically intuited" by the system based on its "watching over the user's shoulder". A number of different collections of policies (profiles) can coexist on the system, and can be selected from (or combined) by the user; or, the system can choose what it determines is the best match of profile(s) to the current user work session.

Under item (a) which depends solely (primarily) on factors of the document to be weighted:

1. Large documents can be weighted more (or less) heavily; etc.

2. Graphics can be favored over text, sound over graphics, etc.; abstracts can be favored over full text; reviews can be favored over abstracts; large-circulation documents can be favored over small-circulation; on-line versions of print publications can be favored over electronically-originated documents; newer (or older, or in a particular date range of) documents can be favored; etc.

3. Content (or association) decisions can be made on the basis of: key-words, abstracts, headings, full-text, etc. searches; similar assessment of documents linked to or from, or referenced by or in, or otherwise related to, this document; authorship; assessments of the identity or profiles of those others who have accessed this document (if known); etc. Each "hit" can count equally, or different types of hits can themselves be sub-weighted, or a complex or non-linear relationship between number and type of hits can be made.

Under item (b) where factors are related between the current and weighted documents:

1. Relating content factors (key words, etc. as described above) between the two documents—for example, matching more key words would be weighted higher; the number of cross-references—for example, a document cited several times can be weighted more heavily then one referenced once, or one referenced forward and backward would be weighted additionally; both documents in question being referenced by (or, more easily determined, referencing) the same third document would increase the weighting; etc.

Under item (c) where factors are related between user session specifications and weighted documents:

1. Stated goals such as: key words (or any of the policies or items described above [or below]); organization types (commercial, academic, research); author names or types (researchers, MDs, etc.); publication types; etc.

2. Instructions such as: deliver only abstracts (or other sub-set of text) first, and full text later, or only if the document is actually viewed, or only when specifically requested,(if at all); deliver text first and pictures or graphics later, or only if the document is actually viewed, or only when specifically requested (if at all); etc.

3. Instructions as to how to weight, or which to use of, the policies or factors described above or below: such as "only pre-send if at lease two factors of a particular type and any other mix of three factors are "hits" (e.g., two key-word matches and any three types of references)"; or, "send abstracts of all referenced documents, but only send full text if at least one third of key words match"; or, "send full text of any referenced document that matches any three factors (from a detailed list not show here) with any of the documents I have already looked at this session"; etc.

Under item (d) where factors are related between user's session history/statistics and weighted documents:

1. As just one example: the system might note that (92% of) all documents actually looked at during this session had the words "virtual reality" in the title, key word list, or abstract and, thus, more heavily weight any potential document that has those words somewhere in the text (or even more heavily for the title, abstract or key word list). Further, the system might notify the user that such an "system inferred point of interest" were noticed.

Under item (e) where factors are related between user general (not session specific) profile specifications and weighted documents:

1. For specifics see item (c) above. Such policies or preferences can be specified in a general profile; and can further be specified for separate profiles for different types of sessions, e.g., academic research, commercial research, legal research, browsing; different states of mind, e.g., feeling sharp vs. feeling fuzzy, feeling like being detailed and in control vs. feeling like letting system make more suggestions, etc.

Under item (f) where factors are related between user general (not session specific) history/ statistics and weighted documents:

1. For specific example see item (d) above. However, such statistics and inferences can be made over many sessions, perhaps only considering sessions that match the current session in type, goals, state of mind, etc.
2. As another example: the system might note that during work-related research sessions, the user almost always reviews the first two documents in toto, irrespective of content, and then (as the user gets frustrated and more discriminating—although the system will be working with statistics rather than psychological analysis) the user views abstracts first and (usually) only downloads documents that match the stated session keywords.

Pyramidal Ordering of Information Elements:

The next component of the instant inventive system is what Inventor refers to as "Pyramidal Ordering of Information Elements".

In short, this term covers a class of techniques (some existent, some new to this invention) that permit small versions of various information elements to be delivered, which contain reduced detail but which are still useful and, in particular, useful for the task of evaluating whether the user wants to access a fuller version of the same information element or document.

This is not the same as information compression, in which a complete information element is encoded into a smaller form, and can be losslessly (or, in some cases, notably for video and graphics, with some loss) reconstructed at a later time. Any sort of information compression, including those disclosed by Inventor in his U.S. patent application Ser. No. 07/077,916, can be used in conjunction with the "pyramidal" techniques disclosed herein.

The term pyramidal is being used here in an informal somewhat prosaic manner. There are a class of mathematical functions with a similar name and Inventor is not necessarily drawing an association with those specifics.

Rather, the intent here is to use the sense of the term pyramidal as is used to describe a desired structure for journalistic writing. Essential facts are disclosed first, followed by a somewhat more complete restatement, followed by a wealth of detail; thus, progressively more detailed and larger versions of the same story follow each other, creating an expanding or pyramidal structure. One can get the gist by a quick perusal of the opening of the article, and may then decide whether to pursue the fuller story by continuing with the more complete and detailed sections which follow.

It may already be common practice to organize some information elements, notably graphics, in a manner that may correspond to Inventor's intention for pyramidal organization, and Inventor is not necessarily claiming the invention of such techniques here. Nevertheless, the use of such techniques for the purposes described herein may, in fact, constitute a new use or inventive improvement over the current art and, to that extent at least, Inventor is claiming inventorship. In particular, some graphics that are delivered in what might be described as pyramidal fashion do not exploit that structure and: are neither interleaved with other information elements; nor is there the ability to make a stop/continue decision between layers or levels delivered.

Further, Inventor believes that several other pyramidal organization methods are new and unique to the instant invention.

Beyond what is described above, it is the further intent of pyramiding that each subsequent "layer" of information (as much as possible) not repeat the information in the prior level. Rather, as much as possible, the new level of information should provide additional detail, not already present, which can be interleaved, or otherwise combined, with the prior level(s) of information already delivered.

See FIG. 17 for a diagram of how several pyramidal layers may be integrated.

1. Examples (which can be used separately or in combination) of pyramiding with a raster graphic image:

Some pixels in a line (and some lines of the image) can be sent first, constituting a low- resolution version of the image. This can be displayed small, or large with large blocky pixels, or large with smooth (low-pass filtered) large pixels. Then additional pixels from already sent lines, and additional lines can be sent and interleaved with the prior information for a higher-resolution version of the image. Third and more levels of detail can also be sent subsequently. The parsing process may not necessarily be as simple as taking every Nth pixel and every Nth line; the information can be low-pass filtered or more complexly filtered prior to sampling; other data sampling/compression schemes can be utilized within the pyramiding process.

Some bits of a pixel can be sent first, followed by more bits later. For example, a 24-bit (8 bits each for Red, Green and Blue) image can be reduced to 8 bits total by sending the most significant 3 bits each of Red and Green and 2 bits for Blue. Alternately, a custom optimized 8-bit look-up table (LUT) can be calculated for the image. Later, additional significant bits (3G, 2R, 3B; followed by 2G, 3R, 3B) can be sent. This is just one example, and bit-parsing can be combined with pixel or line parsing.

In addition, for strings of raster images, i.e., video, the temporal element can be pyramided. For example, very simply, every 64th, 32nd, 16th, 8th, 4th, 2nd, 1st frames can be sent (if not sent in a previous level) as separate levels; or, frames containing major content changes (i.e., key frames) can be sent first; etc. Again, Inventor's U.S. patent application Ser. No. 07/077,916 should be consulted.

Also, a vector, contour or outline version (for example, with flat color or textured fills of enclosed areas) can be derived by analysis of a raster image. This reduced information version could be sent first (perhaps itself sent at several levels of detail) to be replaced by the full raster image at a later level(s).

In general, much more sophisticated approaches for separating information into levels can be applied to this process and, in particular, "wavelet" or other multi-resolution techniques, or related mathematical procedures, may prove useful for this purpose.

2. Similarly, vector graphics or motion sequences can be "thinned" and parsed into pyramidal levels of detail. In general, large (low-spatial frequency) structures will be sent first with smaller details sent later.
3. Audio signals can be pyramidally parsed by: sending sub-sets of samples; sending sub-sets of bits for given samples; sending samples from only 1 of several tracks or channels (again, see Inventor's prior inventions) which may involve stereo, separate languages, etc.; fractal or other compression can be used; reduced phoneme codec-oriented compression might be used.

Further, only part of a message content may be sent at each level, for example every other word. Although that particular option would probably be less useful, the techniques described for text can be applied to audio content.

4. For text sent as ASCII or other coded form, rather than as an image of text, the following techniques can be applied.

First, fonts, drop shadows, colors and other graphic or formatting details can be omitted for a first pass; although, the amount this will reduce bandwidth requirements may not be as significant as with other techniques described herein.

However, a more important pyramidization of text will consist of ordering document elements in a pyramidal fashion, and transmitting them with sufficient placement information to reconstruct the entire document in sequence once elements from several layers are available. For example, the TITLE, ABSTRACT, TABLE OF CONTENTS, INDEX and CHAPTER HEADINGS can be sent in that order. This might be followed by the first paragraph of each chapter; then the first sentence of each paragraph; the large words of sentences first (followed by the context and connector words); etc. What is described, are a number of simple and straightforward concepts which may be combined and expanded upon. In addition, AI and search style techniques can be used to search the text and look for (likely) relevant portions, chapters or paragraphs. These would then be the only ones sent, the ones sent first, or the ones weighted more heavily in an interleaving or emulsification scheme. And, they can also be flagged as "of potential interest" to the user.

5. For W3 or other multimedia pages or documents, graphics can be omitted at a first level (and then sent in a pyramidal fashion, perhaps only when specifically requested (e.g., clicked on) or the document becomes active, i.e., is actually being viewed by the user) being replaced by a text element that says GRAPHIC, PICTURE, BUTTON, etc. In general, a complex scheme for ordering and weighting the various elements of a multimedia document will be possible. And, the user's preferences will be specified in one (or more, for different work purposes or moods) profile as described above.

Combining These Components:

The three inventive components so far described—Emulsification (Interleaving) of BLOBs; Probabilistic Predictive Weighting; and, Pyramidal Ordering of Information Elements—can be combined to achieve a technique for increasing the efficiency of end-user work and end-user communication line usage.

A list of potential "next needed" files, documents or other information resources is assembled—by tracing links, or other references in prior documents; or, by searching directories, abstracts or actual documents.

This list of potential files, documents, pages or other resources available on the net, is ordered by importance and the probability that each will be the next resource the user requests to see. These measures of the importance and likelihood of a document are combined to form a weight which modulates the size and/or frequency of portions of these documents which are then to be interleaved and transmitted over a communications line to the user.

Once a specific next document is selected as the current document, its weight is increased (perhaps monopolizing the communication line) until it (or at least the selected portion (s)) are delivered. Further, once a new document (document portion) is selected and made active, new potential documents are added to the list and the probabilities of all potential documents are revised.

Thus, the expectation that as much as possible of the resource most likely to be needed is maximized.

The pyramidal structure of the various documents guarantees (or at least increases the likelihood) that, although the next needed document has only been partially delivered, the content of the document will still be (at least to some extent) usable and understandable by the user.

All of these techniques would be fine-tuned depending, upon the bandwidth of the available communications channel. For clarity, two narrative examples follow which exhibit, at least, simple versions of the techniques described abstractly above.

Patent Document Search (Narrative Example):

Assume, for the sake of discussion, a patent search is being conducted for an invention in the area of using computer simulation to design kitchens. A first patent number is specified and the document is downloaded. While it is being read by the searcher, abstracts of the patents cited in that first patent are downloaded in an interleaved manner; and, after that, abstracts of secondary references and full-text of primary references are downloaded in an interleaved manner.

After digesting the first document, the searcher chooses only two of the primary references for full text search. The secondary referenced documents, descending from those two primary references chosen, are then weighted more heavily in terms of interleaving. And, abstracts of tertiary references descending the two secondary documents are downloaded with relatively heavier weights compared to abstracts of other tertiary references. This followed by full-text of the high-priority tertiary references. And, so on.

As soon as each element is downloaded (or, perhaps, as the text comes in from the communications line) a search of its content is performed concurrently with additional downloading.

While looking for significant words (e.g., ignoring small and connecting words—the, and, but, however, etc.; ignoring terms of art—embodiment, system, invention, etc.) in those documents actually reviewed by the searcher, the system notes that the two-word sequence "virtual reality" was mentioned repeatedly in 60% of those references. In looking at the text of abstracts of quaternary references as they are downloaded, the system notes that three of them mention that term, "virtual reality", and those that do are weighted more heavily for having their full-text and referenced documents downloaded.

Further, it is noted that three of the patent documents not yet reviewed are cited in many of the documents already looked at or in documents anticipated as having a high probability of being looked at. The weights of those documents are also increased.

When a document is actually looked at, the amount of review time is monitored by the system. Also, the searcher can tag the document as: highly useful, useful, not very useful, not at all useful; or some other similar scale. The weight of that document, and all weight decisions relating to that document are appropriately adjusted up or down as a result.

Further, a set of tools will be made available to the searcher to highlight words, terms, phrases, whole paragraphs or arbitrary sections of text, and references, as being of particular interest; or of non-interest/anti-interest in order to downplay connections that might be made on a statistical/ linguistic basis but which are, in fact, not relevant.

Research Document Review (Narrative Example):

During the review of a pyramided downloaded research paper, the TITLE, ABSTRACT and SECTION HEADINGS are downloaded first. The headings are Introduction, Methods, Experiment 1, Experiment 2, Experiment 3, Experiment 4, Discussion of Results, and Conclusion; not terribly informative. While the abstract is being perused by reviewer, the first paragraph of each section heading is downloaded.

The first paragraph of Experiment 1 reads, in part, that ". . . was administered to twenty-seven laboratory mice . . . ". Now, our hypothetical researcher is interested in reviewing results of administering a particular class of drugs to primates. He would highlight (or from a menu choose) Section 1 and indicate it as "not of interest"; similarly he would highlight the word mice and "dis-emphasize" its interest level.

The first paragraph of Experiment 2 reads, in part, that ". . . was administered to seven chimpanzees . . . ". Our user would first highlight (or from a menu choose) Section 2 and indicate it as "of primary interest"; similarly he would highlight the word chimpanzee and "emphasize" its interest level.

Immediately the system would download Section 2 at full-speed (if it were not yet there) for reviewer to look at; this section is both the current active section of the current active document, but has also been explicitly "emphasized" as of "interest".

Further, the system would search the additional sections and would: download the Experiment 3 section which mentioned chimpanzee 22 times and mouse twice; fail to download the Experiment 4 section which, although it mentioned chimpanzee once, mentioned the words mouse (a form of mice—determined from a look-up dictionary of related forms, synonyms, antonyms, etc.) and mice 32 times. However the sentence that contained the word chimpanzee (as well as the previous and following sentence) would be downloaded and the word chimpanzee would be highlighted; and download the last two sections (but at lower priority) which mentioned chimpanzee and mouse each a few times. The occurrences of chimpanzee would be highlighted (unless reviewer's preference profile indicated not to, which would be an option to those who found such "system-supplied" hints annoying).

Information Impedance Matching:

As described above, the three inventive components disclosed herein are combined to increase the efficiency of work done over a communications network. The various operating parameters of the composite technique would be fine-tuned depending upon the bandwidth of the available communications channel.

The technique can be applied within a single system, to two communications lines of different bandwidths, to implement a method whereby an end-user, working over a low-bandwidth communication line will have the perception of working over a much higher-bandwidth communication line. Apparent performance and response time is improved. See FIG. 1.

The interaction between a large time-sharing computer (serving multiple customers) and the global outside network will be via a (or many) high-bandwidth, high-speed communications line(s). The information resources accessed by that "server" will be from diverse sources and will be of diverse type, content, composition, form and format. Thus, the techniques described herein will not necessarily be practical to apply in all instances.

In particular, the Probabilistic Prediction of documents— the importance and likelihood of need for them—can be done. Linkages and references from current documents can be traced down several levels. Those documents (once accessed) can be further searched for clues as to their potential relevance to the user during the current work session, work in general, general interest, or for clues as to further documents to access.

Thus, the server computer will be acting as an "intelligent agent" for the user, anticipating his needs and searching out potential relevant information.

However, the information may have to be downloaded— as far as the server—in fairly standard fashion. That is because the various information resources being accessed will not necessarily be organized in a pyramidal fashion; and, coming from diverse sources, may not be interleavable, let alone interleaved with weighting factors.

However, once these diverse information resources are assembled in the server, all of the techniques described herein can be used, when downloading from the server to the end user's client computer over the low-bandwidth communication line.

One of the major tasks of the server will (can) be to take the various resources that are not in pyramidal format and parse them for pyramidal transmission. This will be done by the various techniques described above, and the process will be fine-tuned based on the user profile, and the particulars of the current work session, as well as an analysis of the document in question and the specifications of the available communications line.

Overall, this process will likely not diminish (and may even greatly increase) the amount of network traffic done on behalf of a particular user during a particular work session. Much of the information downloaded to the sever in anticipation, may never need to be downloaded as far as the user's client system; much of it may never be seen by the user. However, much more efficient (continuous) use will be made of the communication line between the server and the end user's client system. See FIG. 11.

The result will be an apparent increase in the performance and responsiveness of the overall system to the user's needs.

The task of the large server computer will be to match the high-bandwidth traffic available to it for downloading from the world-wide network with the low-bandwidth channel available to it for uploading to the end user. It must do this in a way that will maintain a maximum of intelligibility of the information being provided to the end user.

In a conceptually similar situation, an electronic signal traveling down a high-impedance (resistance) line must be processed in order to interface it to a low-impedance line so that the signal does not become distorted. The device used to match the characteristics of the two lines is called an impedance matching transformer.

Impedance (resistance) of a wire through which electricity flows, is the electronic equivalent of the radius or bore of a pipe through which water flows, is the equivalent of the bandwidth of a channel through which information flows. Hence, Inventor refers to the process performed by the server computer, in matching the performance of the high-bandwidth input line with the low-bandwidth output line, while maintaining understandability (i.e., without too much distortion of the meaning) of the information, as "information impedance matching".

A commercial name for such a system might be the INFORMATION FUNNEL™.

The Funnel™—An Extension of Emulsification (Narrative Description):

You sit at a desktop system, connected via telephone line and modem to an account on the Funnel. The Funnel is also the site for the TOURING PAGE™ or YELLOW PAGE™ (see next section for details). From your account at the Funnel an ultra-fast/wide "spigot" to the web/net is available to an "intelligent software agent" who downloads its "personality" from your local profile file. This agent anticipates, probabilistically, your demands from the web/net and downloads to its own Funnel site, in a probabilistic emulsified (when possible), fashion. The agent, in turn, downloads to you at your local desktop system in a probabilistic emulsified fashion (definitely), stripping BLOBs, and pyramidizing them.

For example, if you were looking at a page from which you may go to any of five other pages, pyramidized tips of those five pages will be sent to your local machine while you are reading the original page and deciding what to do next. The size (detail level) of each pyramid tip can be adjusted, based upon estimated probabilities; i.e., likelihoods of your desiring to access that page, based on complex and sophisticated functions matching each page's content with goals and statistics describing your current work session and your general work profile. The process can be carried out several levels, downloading the pages/documents linked to or referenced by the five first-level referenced pages, etc.

Stripping a document or page (only one level is described) follows: pictures can be replaced by a box that says "pix" or a small, low-res version of the graphic; whole text can be replaced by some combination of headlines, first sentence of paragraph, first few words of sentence, first line, key words, etc.; and, fonts and other formatting "prettification" can be stripped out. Similarly, buttons on other graphics can be simplified. In short: translation of the page description to a restricted sub-set description language; data compression; and, knowledge that a smart, sophisticated, "fill in the blanks" display driver is at your local machine—these will permit a faster delivery of a low-information-density version of the document quickly, with later detail to follow as/if needed. This, in turn, will permit you to have (apparently) much faster access and/or browsing capabilities. When a higher level of interest in a particular document (or document section) is probabilistically determined, progressively more detail will be downloaded to your system (or the weight for that item will be increased). Actually looking at a document (or section of document) is the highest level of interest and, if all detail is not yet available, a displayed page will take on detail and completeness as you view it.

When possible, the section of document being viewed would have highest priority within the selected document. That is to say, if a large (compared to the size of the screen) document is being viewed, the position of the currently viewed portion of the document would be fed back at least as far as the Funnel server. If the W3 site feeding the Funnel were capable of the behavior described in this paragraph, the current window position would be fed back to the W3 site as well. In either or both cases, the document pyramidization would be (re-)structured so that information describing the details of the currently viewed section would be sent before (or, at least with higher weighting or priority) information describing the other parts of the document.

The Yellow Page™ and Network Caching™:

Briefly, the INFORMATION FUNNEL, as described herein, will be more useful and effective if combined with two other system components which will be described briefly below. A very large computer service is envisioned; a large customer base will make the entire operation more effective and efficient.

The first of the two other system components is a directory or yellow pages for the Internet, W3, etc. A number of printed and electronic directories are available which are intended as directories of the network. What is envisioned here is a comprehensive list of sites on the network cross-indexed to a large number of categories and key-words which will facilitate user-directed searches as well as facilitate the AI or intelligent agent functions described above. This database can be compiled by automated searching and analysis of the information resources available at the various network sites.

In addition, various commercial or other sites might be invited to provide "listings". And, further, local (to this system) copies of other's catalogs and other W3 resources might be kept for downloading to customer's client systems. These local copies may be useful because (at least for often accessed resources) communication requirements would be reduced and response time reduced if copies were already available at the server system.

The system would, when a request for such an item were made, see if a local copy were available and, only if not, get it from the network. Further, even if a local copy were available, a request to the remote site might be made to ask if the resource had been modified since last retrieved. If it had been updated, a new copy (of at least the modified part) would be downloaded. For catalogs and such, which were intentionally deposited by others at the sever site, it may be the responsibility of the depositor to update the local copy.

Such an Internet/W3 directory might be called THE YELLOW PAGE™ a hybrid of HOME PAGE—the root entry for a W3 site—and the YELLOW PAGES telephone directory. Alternately, it might be called THE TOURING PAGE™. An additional list of potential trademarks is listed at the end of this document.

The second system component Inventor calls NETWORK CACHING™. As explained above, a large service and system is envisioned with a very large customer base. Many customers will be accessing a portion of the same information as other customers. Thus, in order to reduce the need for communication time and bandwidth, copies of network information can be kept at the server system in anticipation of later customers requiring the same information. Again: the system would, when a request for such and item were made, see if a local copy were available and, only if not, get it from the network. Further, even if a local copy were available a request to the remote site might be made to ask if the resource had been modified since last retrieved. If it had been updated a new copy (of at least the modified part) would be downloaded.

Which items to keep locally, and which to discard immediately, would be made by the same kind of probabilistic analyses as described above; in particular, by keeping cross-statistics between the interests and behavior of the many customers on the system. Home pages for many types of sites (which, generally, every access passes through) would be given additional weight. Further, if an information resource was particularly hard to get again (e.g.: it is large; it comes over a low-bandwidth, slow, hard to reach (often busy) or unreliable communications line; etc.) it would also be given additional weight as far as deciding whether to keep it around. Items often requested (in general) would be weighted more heavily. Items often requested (in the short term) would be weighted more heavily.

One user can even be notified when a second user has downloaded information that might be interesting to the first. Such a determination can be made based on the content of the document, and/or on statistics about the interests (and shared interests) of the two customers.

An item might be kept locally for a set period and then discarded. In that way, often accessed information would stay around pretty much continuously. A FIFO policy can otherwise be applied as the information cache becomes filled.

An Alternate Embodiment:

The group of embodiments, described above, employ—in addition to the more standard communications network itself—a computer system running non-standard information processing software (i.e., the Funnel) that is interposed between the information source systems available on the W3 (or elsewhere) and the end user's computer system.

An alternate embodiment would comprise document source (server) and document browsing (client) systems that each operated with communications software that had been augmented to include the techniques described above. See FIG. 2.

In this case the same basic techniques can be applied, that is: interleaving of multiple documents or document parts (e.g., web pages); probabilistic weighting of the size and/or frequency of interleaved document portions; "pyramidization" of documents so that documents that have only been partially delivered are still useful to review.

However, there will be differences in that the software running on the server site will, in general, be more familiar with its own source information, and less familiar with the user's statistical history profile than as described above for the Funnel embodiment. In particular, this will mostly effect the determination of the probabilities used to calculate the emulsification (interleaving) weights. A narrative example will illustrate.

On-line Catalog (Narrative Example):

The following narrative example will describe an on-line catalog with content typical of a department store.

A naive predictive or probabilistic approach will be described first, and this may be the mode of the earliest interaction with a catalog system, even if that system uses more sophisticated prediction in later stages of interaction. Reference to FIG. 4 will be made during this discussion.

One or more preliminary introductory pages may come first, analogous to: a catalog cover; a logon process that can include user identification, method of payment, (intent description, questionnaire or profile downloading as described later), etc.; a list of last minute changes or "special" sales; etc. After that true interactivity will begin.

What comes next will be what might be referred to as a root node, home page, top interactive level, or table of contents (TOC) page; call this Level 0. Its contents (besides any prettifying graphics or icons) might be as simple as a list of "departments"

While the user is browsing this storewide directory, unbidden the system will download a series of Level 1 department (e.g., men's clothing, books, housewares, lingerie) directories. Since the machine knows nothing about the user, they will all be downloaded with equal probability. However, the text headlines (pyramid tip) will be sent first from all pages; then more text from all pages interleaved; finally icon pictures. The headlines will be available to look at even before the full text or icons get there. Additionally, the hyperlinks associated with the icons will be hot, just without pictures.

After the level 1 pages get there level two pages (groupings within a department, e.g., coats, pants, small appliances, dishes, etc.) will be sent in a similarly interleaved fashion; all of them. However, as soon as the user clicks on a level one department link and gets that departmental level one page displayed (if and when this information can be fed back to the catalog server) the level 2 pages associated with the level 1 pace being displayed will get top priority as the expense of other level 2 pages. Similarly, the level three pages (single items) associated with the current level one page will be downloaded in a similar equal probability fashion until a specific level two page is selected. Etc. As the user traverses the nodes of the catalog tree, the items on the next level, attached to the current node will always be sent unbidden. Of course, a specific request from the user will override this barrage of guessed data.

A more intelligent guessing process may be facilitated by a questionnaire in a early page which could determine for example: the user is a 55 year old male; shopping for his teenaged daughter's birthday; wants to spend about 50$ to 75$; characterizes her taste as "unknown". In that case, before the user even selects a level one page, level 3 pages containing sweaters, jeans, CDs and rock concert tickets will already be downloaded.

Similarly, (perhaps via a published standard, or by registering with a store) a user's preference profile may be downloaded (or that of a person that is being shopped for) and size, color and "likes" may be codified for the system to match with items of likely interest.

Additionally, that information can be compiled from previous purchases at that store or generally (perhaps by a credit card company) although the legality and advisability of collecting such data is not certain.

Similarly, "suggestions" may be made by the systems of recently "popular items" and this may be done on an "since you liked (i.e., bought) this item you may like this other item which was bought by many people who bought the first item".

One particularly nice feature for such a catalog (or more generally the web) will be in the web browser display a tree-like structure of the entire catalog indicating which nod is the current node and the state (already downloaded, in transit, not requested, etc.) of other nodes. See FIG. 13.

NEW PROTOCOL

The next subject will be how to provide communications facilities that will facilitate such probabilistic, pyramidal, interleaving.

Preliminaries:

The first thing to note is that there are at least three distinct ways to implement the basic invention utilizing internet-like communication protocols. These are: micro-protocol, macro- protocol and augmented protocol and will be described below.

Additionally for most optimal results, all computer on the network should be aware of the new standards. In that cast TCP/IP-like facilities will be provided.

However, in the absence of that, specific pairs of servers and (populations of) users may with foreknowledge use a not-widely-adapted private standard. Or, as in the catalog system described previously, a provider may (in a minimal fashion) provide such probabilistic interleaving services. However, one cannot ask for probabilistic interleaving if the server has no such facilities. In that case a meta-protocol will piggyback on (or below) TCP/IP like standards.

Similarly, if a service provider and a population of end-users are that pair, the Funnel service may be implemented. In this case the service provider will contact the network with standard TCP/IP-like facilities. However, in this case a new version of [C]SLIP/PPP dial-up protocol would be used.

In all cases the intention will be to establish multi-thread communication.

Micro-protocol:

In this case standard TCP/IP-like packets will be received over a single socket or port. But within that packet will be a number of sub-packets, each belonging to a sub-connection. These may then be assigned in different sizes or at different rates in order to affect priorities for different documents, document levels, document types, document part (MIME) types, etc.

In this case the inner packet information would be split up into individual sub-packets. Each would have a header containing, at least, what sub-connection it belonged to. Alternately, the whole packet might start with a "map" of the packet's contents.

See FIG. 14 for a diagram of such a data structure.

Macro-protocol:

In this case standard TCP/IP-like packets will again be used. However, in this case a multiplicity of sockets, ports or connections will be established. In this way, different document streams may be distinguished by referring to the logical line that they are being received on. See FIG. 15 for a diagram of such a data structure.

Augmented Protocol:

In this case an additional layer of protocol will be established as an inside wrapper underneath the IP address and the TCP packet structure.

Here there can be a single socket per client/server pair (unlike the macro-protocol case) and there will be a one-to-one correspondence between logical and actual packets (unlike the micro-protocol case). See FIG. 16 for a diagram of such a data structure.

The inside wrapper will, at a minimum, have a designation of which sub-connection the packet is coming in on, so that the document or document part can be identified.

Inventor has adopted the terminology of CABLE and FIBER to indicate that a multi-thread connection is established with sub-connection signal capability.

The following table indicates a list of some of the inner layer packet header designations that can be implemented with this approach.

| DESIGNATION NAME | EQUIVALENT OR USE |
|---|---|
| CABLE NUMBER | SOCKET or PORT NUMBER |
| FIBER NUMBER | INDIVIDUAL SUB-CONNECTION |
| DOCUMENT NAME | USEFUL TO DOUBLE UP IF RUN OUT OF FIBERS |
| DOCUMENT PART NAME | |
| DOCUMENT TYPE | MIME-LIKE OR MAY INDICATE ITEMS LIKE CATALOG OR REVIEW |
| DOCUMENT PART TYPE | AS IN HEADINGS, ABSTRACT, ETC. |
| DOCUMENT LEVEL | AS PER PYRAMIDIZATION |
| REQUESTED PRIORITY | AS PER USER REQUEST |
| SENDING PRIORITY | SAY, FROM CATALOG SYSTEM |

With priority information embedded in the packet, if system-wide usage is adopted then every node on the network may act as a funnel. That is not to say that my high-priority request will be served before your low-priority request; that would defeat the purpose, everybody would ask for everything as high priority. However, for a particular user or site, deliveries may be prioritized.

In that case, however, low-priority packets may not be allowed to pile up. So not only is labeled priority a factor, but how long has a packet waited, and how big a backlog for that user or site is there.

However, in general, the overall network may be sped up if generally, people want to get their web-page text fast, make a decision, and wait for pictures only if this looks interesting. If most transactions were so prioritized that overall traffic of text would improve; and, then adopting such a policy would be effective for individuals.

In order to make this particularly effective, once you kill a page (decide it is not of interest) that information would be sent back to the server in order to terminate the transmission. With a single connection that is easy, just kill the connection. However, with a cable, individual fibers will have to be activated and deactivated by request.

Additionally, when requesting for an information resource or, more particularly a multiplicity of them to be interleaved, each requested resource will have a requesting priority associated with it. a mechanism will be provided in the protocol to change the priority of any in progress transmission including, specifically, the ability to: kill the resource; suspend transmission of the resource but do not kill it; make this resource, temporarily until told otherwise, the selected resource and devote all possible bandwidth to it at the expense off all other requests on this cable. Application programs will be able to make great use of such facilities by upping the priority on selected items in a hyper-media session.

Other requests will be built into this protocol. One is validation. Particularly for web-caching, but for other purposes, one may instead of requesting a resource, request to validate a resource for a particular date/time or version number. What will be sent will then be an OK (indicating that the document is current) or the recent document itself. In addition, for applications that are mutually aware of this, what may be sent is not the entire document but, rather, instructions to update a small portion of the document. Such delta-modulated versions can be kept for each revision and, by comparing the requested date with the current date the appropriate set of update directions sent. Of course, the receiving client program will have to be able to accept and affect such change directions for this to work. See FIG. 17 for a diagram of how several updates may be made on this bases, or for adding pyramidal data levels.

In addition, when a web browser is displaying a not-yet validated cached resource, it will indicate by flashing a "not yet valid indicator" until such time as the date is confirmed or the resource updated.

Similarly, a "request summary" flavor of request may be adopted where in response to such a request an index, summary or card-catalog-like entry precede the transmission of the actual resource. Options here will permit the resource to follow: unless otherwise killed; not until interest is confirmed; automatically sent (or killed) after a delay to permit user decision.

AVAILABILITY OF ELEMENTS OF TECHNOLOGY

It should be noted that the vast majority of individual elements of the foregoing invention are available "off-the-shelf" as hardware and software components, and are easily integrateable by one of ordinary skill in computer systems programming, integration and administration.

Specifically, computer add-in hardware boards are available to provide FAX/Modem capabilities, and "voice mail" capabilities (i.e., voice recording and playback, sensing of DTMF keypad entry, and reading of embedded DID and Caller ID signals). These components are available from many vendors and many developer-level software routines and whole application programs are available to operate such boards. These software routines can be coordinated and made to communicate and exchange information under operating systems such as UNIX, DOS, Windows, or System 7.

Similarly, the communication, EMailing and other software functions that make up "The Internet" are widely know and available and their use and adaption are well within the ken of one of ordinary skill in computer network administration.

Thus, the various technological elements that comprise the invention disclosed herein are (except as described otherwise) standard, well-known, widely available elements. Their construction, operation, use and integration are not, in general, the subject of the instant invention. For the details of the construction, operation, use and integration of these components the practitioner is directed to the available published literature, as well as software and equipment manuals, in the areas of hardware, software and information formats relating to, without limitation: FAX machines, FAX/Modems, FAX servers, voice mail devices, barcode printing, barcode scanning, optical character recognition, computer communication and networking (including, specifically, EMail, The Internet, and related communication and information exchange protocols such as HTTP, UDP, TCP/IP, etc.) and computers and operating systems.

Many of the elements of the present invention are available "off-the-shelf" and, in and of themselves, not inventive. However, the design, construction and operation of the composite systems and techniques disclosed herein, as well as the use to which they are put, are the subject of the instant invention and are presented as novel and useful. These novel, composite, high-level system designs are described herein and depicted in the accompanying system and flow diagrams.

Finally, it is noted that the capabilities and system components described herein may be provided by equivalently functioning substitutes. For example: signals and hardware may be of analog or digital construction; certain functions may be exist as special purpose hardware, or as programming residing on general purpose hardware; software may be provided on PROMs, or be stored in memory or on magnetic or optical disk; various capabilities may, in different situations, reside in a FAX machine, FAX/Modem in a computer, in a local computer, or in a remote computer; many options exist for FAX-to-FAX, FAX-to-computer or computer-to-computer interconnection; etc. The use of any appropriate system component, now in use or later developed, to affect the methods and systems described herein, is considered to be within the scope of the instant invention.

The flows depicted in the software flow diagrams herein are exemplary, some items may be ordered differently, combined in a single step, skipped entirely, or accomplished in a different manner. However, the depicted flows will work. In particular, some of these functions may be carried out by hardware components, or by software routines residing on, or supplied with, such a component.

Similarly the systems depicted in the system diagrams herein are exemplary, some items may be organized differently, combined in a single element, split into multiple elements, omitted entirely, or organized in a different manner. However, the depicted systems will work. In particular, some of these functions may be carried out by hardware components, or by software routines residing on, or supplied with, such a component.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

The contents of the disclosure of this patent document, and the accompanying figures, is copyright to the inventor. The copyright owner has no objection to the facsimile reproduction of the patent document or the patent disclosure, as it appears as issued by the Patent and Trademark Office, to the extent required by law. Written permission of the copyright holder must be obtained for any other use. Copyright holder otherwise reserves all copyright rights whatsoever, including the right to excerpt, compile or otherwise alter or adapt, or make any other use of, this information.

Further, inventor reserves any and all trademark and related rights to any trademarkable elements contained herein.

In any event, any publication of, or about, any of the information contained herein must contain appropriate patent, trademark and/or copyright notices.

Now that the invention has been described, what is claimed as new and desired to be secured by Letters Patent is:

1. An improved method for transmitting a multiplicity of data files from a first transmitting computer to a second receiving computer, via a packet-switching digital communications network, utilizing a communications protocol employing port addresses corresponding to data streams wherein the normal mode of operation is to transmit each data file as a data stream of packets separate from the data streams of other data files, wherein said improvement comprises a transmission where:
   a. said multiplicity of data files comprise a multi-level, hierarchical structured, document;
   b. for at least two levels, the data files comprising each level are combined with the other data files of that same level to create a composite data structure;
   c. the composite data structures for each level are transmitted in level order; and,
   d. said multi-level combined transmission comprises a continuous transmission via a single data stream.

2. A method as in claim 1, wherein said data files comprise HTTP document elements.

3. A method for data communication comprising:
   a. communication between an intermediate computer and a network via a standard communications protocol; and,
   b. communication between said intermediate computer and a receiving computer via said improved method of claim 1.

4. The process of claim 1, used in conjunction with a Worldwide Web search engine.

5. The method of claim 1 embodied as an enhanced communications protocol.

6. An enhanced communications protocol standard comprising instructions to carry out the method of claim 1.

7. A computer program comprising instructions to carry out the method of claim 1.

8. A method as in claim 1, comprising in addition the improvement of:
   a. transmitting a series of data packets comprising information from a multiplicity of data files, and wherein said data packets are sequenced in a manner such that said information from at least three data files are arranged in an interleaved manner.

9. A method as in claim 1, comprising in addition the improvement of:

a. each of at least three data packets is further divided into at least three sub-packets; and, b. in any one of said at least three data packets, each of said sub-packets comprises a section of content from a distinct one of a multiplicity of data files, and at least three of said at least three data packets comprise content from the same data file.

10. A method as in claim 1, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

11. A method as in claim 1, wherein said at least two levels of step b. is at least four.

12. An improved method for transmitting a multiplicity of data files from a first transmitting computer to a second receiving computer, via a packet-switching digital communications network, utilizing a communications protocol employing port addresses corresponding to data streams wherein the normal mode of operation is to transmit each data file as a data stream of packets separate from the data streams of other data files, wherein the improvement comprises a transmission, of a single data stream comprising a sequence of data packets, comprising at least the steps of:

a. establishing a data stream connection between said first computer and said second computer;

b. transmitting via said data stream connection a first data file comprising a first series of at least one data packet;

c. maintaining in a open state said data stream connection; and, d. transmitting via said data stream connection at least one additional data file each comprising an additional series of at least one data packet.

13. A method as in claim 12, for transmitting at least two data files via a packet-switching digital communications network, wherein the normal mode of operation is to separate each of said data files into a linear sequence of segments and transmitting each of said segments as a data packet in sequential order, wherein said improvement comprises in addition the steps of:

a. organizing each of said at least two data files into at least two groupings, each of said groupings comprising information at a distinct level of detail, the levels of detail in any of said at least two data files not necessarily corresponding to the levels of detail of any other of said at least two data files;

b. transmitting, via said communications protocol, information from each of said at least two data files a first of said groupings comprising information at a first level of detail; and, c. subsequently transmitting, via said communications protocol, information from each of at least two said data files a second of said groupings comprising information at a second finer level of detail.

14. A method for receiving multiplicity of data files via a packet-switching digital communications network, transmitted by the method of claim 13 comprising the steps of:

a. receiving at least one data stream comprising a multiplicity of data packets;

b. upon receiving information from a first of said groupings comprising information at a first level of detail, creating a first version of said data files at said first level of detail;

c. making said first version available for display;

d. upon receiving information from a second of said groupings comprising information at a second level of detail, creating a second version of said data files at said second level of detail; and, e. making said second version available for display.

15. A method as in claim 14, wherein said data files comprise text data files.

16. A method as in claim 14, wherein said data files comprise HTTP document elements.

17. The process of claim 14, used in conjunction with a Worldwide Web search engine.

18. A method as in claim 13, wherein said data files comprise text data files.

19. The method of claim 13, wherein said data information comprises a computer database.

20. The process of claim 19, used in conjunction with a Worldwide Web search engine.

21. The method of claim 13, wherein said information comprises legal information.

22. A method as in claim 13, wherein said data files comprise HTTP document elements.

23. The process of claim 13, used in conjunction with a Worldwide Web search engine.

24. A method as in claim 13, comprising in addition the improvement of:

a. transmitting a series of data packets comprising information from a multiplicity of data files, and wherein said data packets are sequenced in a manner such that said information from at least three data files are arranged in an interleaved manner.

25. A method as in claim 13, comprising in addition the improvement of:

a. each of at least three data packets is further divided into at least three sub-packets; and, b. in any one of said at least three data packets, each of said sub-packets comprises a section of content from a distinct one of a multiplicity of data files, and at least three of said at least three data packets comprise content from the same data file.

26. A method as in claim 13, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

27. A method as in claim 12, for transmitting at least one document comprising a multiplicity of data files via a packet-switching digital communications network, wherein the normal mode of operation is to separate each of said data files into a linear sequence of segments and transmitting each of said segments as a data packet in sequential order, wherein said improvement comprises in addition the steps of:

a. organizing said at least one document into at least two groupings, each of said groupings comprising information of a distinct type and at least one of said groupings comprising information derived from more than one of said data files;

b. transmitting, via said communications protocol within a single data stream, information from a first of said groupings comprising information of a first type; and, c. subsequently transmitting, via said communications protocol, information from a second of said groupings comprising information of a second type.

28. A method for receiving a multiplicity of documents each comprising at least two data files via a packet-switching digital communications network, transmitted by the method of claim 27 comprising the steps of:

a. receiving at least one data stream comprising a multiplicity of data packets;

b. upon receiving information from a first of said groupings comprising information of a first type, creating a first version of said multiplicity of documents;

c. making said first version available for display;

d. upon receiving information from a second of said groupings comprising information of a second type, creating a second version of said multiplicity of documents; and, e. making said second version available for display.

29. A method as in claim 28, wherein said data files comprise HTTP document elements.

30. The process of claim 28, used in conjunction with a Worldwide Web search engine.

31. A method as in claim 27, wherein said data files comprise HTTP document elements.

32. The process of claim 27, used in conjunction with a Worldwide Web search engine.

33. A method as in claim 27, comprising in addition the improvement of:

a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;

b. sequentially transmitting information for at least three levels of progressively finer detail, where each transmission comprises groupings from at least two files, and where the groupings from any one file are ordered in progressively finer levels of detail.

34. A method as in claim 27, comprising in addition the improvement of:

a. transmitting a series of data packets comprising information from a multiplicity of data files, and wherein said data packets are sequenced in a manner such that said information from at least three data files are arranged in an interleaved manner.

35. A method as in claim 27, comprising in addition the improvement of:

a. each of at least three data packets is further divided into at least three sub-packets; and, b. in any one of said at least three data packets, each of said sub-packets comprises a section of content from a distinct one of a multiplicity of data files, and at least three of said at least three data packets comprise content from the same data file.

36. A method as in claim 27, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

37. A method as in claim 27, wherein said multiplicity of data files is at least four.

38. A method as in claim 27, wherein said at least two groupings in step a. is at least four and, in addition, performing the steps of:

d. subsequently transmitting, via said communications protocol within a single data stream, information from a third of said groupings comprising information of a third type; and, e. subsequently transmitting, via said communications protocol, information from a fourth of said groupings comprising information of a fourth type.

39. A method for receiving a data file via a packet-switching digital communications network, transmitted by the method of claim 38 comprising the steps of:

a. receiving at least one data stream comprising a multiplicity of data packets;

b. upon receiving information from a first of said groupings comprising information of a first type, creating a first version of said document;

c. making said first version available for display;

d. upon receiving information from a second of said groupings comprising information of a second type, creating a second version of said document;

e. making said second version available for display;

f. upon receiving information from a third of said groupings comprising information of a third type, creating a third version of said document;

g. making said third version available for display;

h. upon receiving information from a fourth of said groupings comprising information of a fourth type, creating a fourth version of said document; and, i. making said fourth version available for display.

40. A method as in claimed 12, for providing information to an end user via a digital communications network, wherein said improvement comprises in addition the apparent increase in communication bandwidth, affected by the utilization of portions of the communication channel bandwidth normally unused, by the steps of:

a. requesting of said network a first selection of information specified by said end user;

b. upon reception of said first selection of information performing automated searching of said first selection to locate at least some references to additional selections of network-obtainable information which can potentially be specified by said end user;

c. making a choice, from among said references to additional selections, of at least one additional selection to request; and, d. requesting of said network at least some of said at least one additional selection of network-obtainable information prior to said end user specifying additional selections.

41. The method of claim 40, comprising the additional steps of:
  e. upon the specification of a second selection of information by said end user requesting said second selection if not already requested; and,
  f. requesting, if possible, the network to delay the delivery of other requested information in favor of the information specified in said second selection.

42. The method of claim 40, comprising the additional steps for at least one additional level of:
  e. upon reception of at least some of said additional selections of network-obtainable information, conduct further automated searching of said additional selections to locate at least some references to a next-level of additional selections of network-obtainable information which can potentially be specified by said end user;
  f. making a choice, from among said references to a next-level of additional selections, of at least one next-level additional selection to request; and,
  g. requesting of said network at least some of said next-level additional selections of network-obtainable information prior to said end user specifying additional selections.

43. The process of claim 42, used in conjunction with a Worldwide Web search engine.

44. The method of claim 42 carried out for at least two iterations.

45. The method of claim 40, wherein in step c., the choice of which of said additional selections of network-obtainable information are to be requested of said network is based upon user-specified criteria.

46. The method of claim 40, wherein in step c., the choice of which of said additional selections of network-obtainable information are to be requested of said network is based upon criteria obtained from a user-profile.

47. The method of claim 40, wherein in step c., the choice of which of said additional selections of network-obtainable information are to be requested of said network is based upon criteria obtained from analysis of a history of prior use of the instant system by said end user.

48. The method of claim 40, wherein in step c., the choice of which of said additional selections of network-obtainable information are to be requested of said network is based upon criteria pertaining to document type.

49. The method of claim 40, wherein in step c., the choice of which of said additional selections of network-obtainable information are to be requested of said network is based upon criteria pertaining to document content.

50. The method of claim 40, wherein in step c., the choice of which of said additional selections of network-obtainable information are to be requested of said network is based upon criteria pertaining to the comparison between the content of at least two documents.

51. The method of claim 40, wherein in step c., the choice of which of said additional selections of network-obtainable information are to be requested of said network comprises for at least some information requesting only portions of said information.

52. The method of claim 40, wherein in step c., the choice of which of said additional selections of network-obtainable information are to be requested of said network is based upon criteria developed by repeating at least once the steps of:
  a. running a simulation, or at the first iteration a history, with a current set of parameters, and comparing the documents downloaded in a predictive fashion by the system and documents actually requested by said end user;
  b. adjustment of at least one parameter upon which said documents downloaded in a predictive fashion were selected by the system;
  c. running a simulation of a predictive downloading session utilizing the adjusted parameters, and comparing the documents downloaded in a predictive fashion by the system and documents actually requested by said end user;
  d. comparing system performance utilizing the current and the adjusted sets of parameters; and,
  e. selecting as the new current set of parameters those which result in the better performance as determined in step d.

53. The process of claim 52, used in conjunction with a Worldwide Web search engine.

54. A method as in claim 52, wherein said at least once, of the preamble, is at least three times.

55. A method as in claim 52, wherein said multiplicity of data files, of step c., is at least four.

56. A method as in claim 55, wherein said for at least some packet, of step d., is at least four packets.

57. A method as in claim 52, wherein said for at least some packet, of step d., is at least four packets.

58. The method of claim 40, wherein said data information comprises a computer database.

59. The process of claim 58, used in conjunction with a Worldwide Web search engine.

60. The method of claim 40, wherein said information comprises legal information.

61. A method as in claim 40, wherein said data files comprise HTTP document elements.

62. The method of claim 40, wherein in step c., the choice of which of said additional selections of network-obtainable information are to be requested of said network is based upon the operation of an 'Artificial Intelligence' algorithm.

63. The process of claim 62, used in conjunction with a Worldwide Web search engine.

64. A method as in claim 62, wherein said 'Artificial Intelligence' algorithm at least in part operates by comparing said additional selections with the document currently being accessed by said end user.

65. A method as in claim 62, wherein said 'Artificial Intelligence' algorithm at least in part operates by comparing said additional selections with documents previously accessed by said end user.

66. A method as in claim 65, wherein said documents previously accessed are ranked by the amount of time said end user accessed them.

67. A method as in claim 65, wherein said documents previously accessed are ranked by an end user supplied evaluation.

68. A method as in claim 62, wherein said 'Artificial Intelligence' algorithm at least in part operates by comparing said additional selections with an end user supplied characterization of goals.

69. A method as in claim 62, wherein said 'Artificial Intelligence' algorithm at least in part operates by comparing said additional selections with an end user profile.

70. The process of claim 40, used in conjunction with a Worldwide Web search engine.

71. A method as in claim 40, comprising in addition the improvement of:
  a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;

b. sequentially transmitting information for at least three levels of progressively finer detail, where each transmission comprises groupings from at least two files, and where the groupings from any one file are ordered in progressively finer levels of detail.

72. A method as in claim 40, comprising in addition the improvement of:

a. transmitting a series of data packets comprising information from a multiplicity of data files, and wherein said data packets are sequenced in a manner such that said information from at least three data files are arranged in an interleaved manner.

73. A method as in claim 40, comprising in addition the improvement of:

a. each of at least three data packets is further divided into at least three sub-packets; and, b. in any one of said at least three data packets, each of said sub-packets comprises a section of content from a distinct one of a multiplicity of data files, and at least three of said at least three data packets comprise content from the same data file.

74. A method as in claim 40, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

75. A method as in claim 40, comprising in addition the improvement of:

a. preforming this method by the operation of a client computer program operating in conjunction with a companion server computer program.

76. A method as in claim 12, for providing information to an end user via a digital communications network, wherein said improvement comprises in addition the apparent increase in communication bandwidth, affected by the utilization of portions of the communication channel bandwidth normally unused, by the steps of:

a. providing via said network a first selection of information specified by said end user and requested of said network;

b. performing automated searching of said first selection to locate at least some references to additional selections of network-providable information which can potentially be specified by said end user; and, c. providing via said network at least some of said additional selections of network-providable information prior to said end user specifying additional selections.

77. A method as in claim 76, wherein said data files comprise HTTP document elements.

78. The process of claim 76, used in conjunction with a Worldwide Web search engine.

79. The method of claim 76, comprising the additional steps for at least one additional level of:

e. in conjunction with providing at least some of said additional selections of network-obtainable information, conduct further automated searching of said additional selections to locate at least some references to a next-level of additional selections of network-obtainable information which can potentially be specified by said end user;

f. making a choice, from among said references to a next-level of additional selections, of at least one next-level additional selection to request; and, g. providing via said network at least some of said next-level additional selections of network-providable information prior to said end user specifying additional selections.

80. The method of claim 79 carried out for at least two iterations.

81. The method of claim 76, comprising the additional steps of:

d. upon the specification of a second selection of information by said end user providing said second selection if not already being provided; and, e. if possible, causing a delay in the delivery of other requested information in favor of the information specified in said second selection.

82. The method of claim 76, wherein prior to step c., a choice is made of which of said additional selections of network-obtainable information are to be provided via said network based upon user-specified criteria.

83. The method of claim 76, wherein prior to step c., a choice is made of which of said additional selections of network-obtainable information are to be provided via said network based upon criteria obtained from analysis of a history of prior use of the instant system by said end user.

84. The method of claim 76, wherein prior to step c., a choice is made of which of said additional selections of network-obtainable information are to be provided via said network based upon criteria pertaining to the comparison between the content of at least two documents.

85. The method of claim 76, wherein said information comprises legal information.

86. The method of claim 76, wherein prior to step c., a choice is made of which of said additional selections of network-obtainable information are to be provided via said network based upon the operation of an 'Artificial Intelligence' algorithm.

87. A method as in claim 76, comprising in addition the improvement of:

a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;

b. sequentially transmitting information for at least three levels of progressively finer detail, where each transmission comprises groupings from at least two files, and where the groupings from any one file are ordered in progressively finer levels of detail.

88. A method as in claim 76, comprising in addition the improvement of:

a. transmitting a series of data packets comprising information from a multiplicity of data files, and wherein said data packets are sequenced in a manner such that said information from at least three data files are arranged in an interleaved manner.

89. A method as in claim 76, comprising in addition the improvement of:
   a. each of at least three data packets is further divided into at least three sub-packets; and,
   b. in any one of said at least three data packets, each of said sub-packets comprises a section of content from a distinct one of a multiplicity of data files, and at least three of said at least three data packets comprise content from the same data file.

90. A method as in claim 76, comprising in addition the improvement of:
   a. individually specifying the amount other than a default amount of transmission bandwidth dedicated to at least one of a multiplicity of data files to be simultaneously transmitted by associating a set of transmission weights to the set of files being simultaneously transmitted;
   b. transmitting said multiplicity of data files; and,
   c. individually adjusting the amount of transmission bandwidth dedicated to said at least one of said multiplicity of data files in accordance with said set of transmission weights.

91. A method as in claim 76, comprising in addition the improvement of:
   a. preforming this method by the operation of a server computer program operating in conjunction with a companion client computer program.

92. A method as in claim 12, for transmitting a multiplicity of network information resources via a packet-switching digital communications network, utilizing a communications protocol wherein the normal mode of operation is to send a data file from a server in response to a request from a client, the requested file being passed along by one or more intermediary computers on said network as a data stream of packets, and wherein said improvement comprises in addition the steps of:
   a. a request being made by a client computer for a network information resource, said request being passed through at least one intermediary computer, said request eventually being received by a server computer;
   b. said request being filled by said server computer by the transmission of said network information resource, which transmission is passed through said at least one intermediary computer, said transmission eventually being received by said client computer;
   c. the analysis by said intermediary computer of said network information resource to identify references to additional network information resources which can potentially be requested by the operator of said client computer;
   d. the requesting, via the network, by the intermediary computer, of at least some of said additional network information resources, prior to such a request actually being placed by said operator of said client computer;
   e. the reception and retention by said intermediary computer of at least some of said additional network information resources;
   f. the actual request by said operator of said client computer of at least some of said additional network resources; and,
   g. the transmission to said client computer by said intermediary computer of said previously requested and retained copy of at least some of said actually requested additional network information resources.

93. A method as in claim 92, wherein said data files comprise HTTP document elements.

94. The process of claim 92, used in conjunction with a Worldwide Web search engine.

95. The method of claim 92, comprising the additional steps for at least one additional level of:
   h. in conjunction with the pass-through by said intermediate computer of at least some of said additional selections of network-obtainable information, conduct further automated searching of said additional selections to locate at least some references to a next-level of additional selections of network-obtainable information which can potentially be specified by said end user;
   i. said intermediary computer making a choice, from among said references to a next-level of additional selections, of at least one next-level additional selection to request;
   j. the requesting, via said network, by said intermediary computer, of at least some of said next-level additional network information resources, prior to such a request actually being placed by said operator of said client computer;
   k. the reception and retention by said intermediary computer of at least some of said next-level additional network information resources;
   l. the actual request by said operator of said client computer of at least some of said next-level additional network resources; and,
   m. the transmission to said client computer by said intermediary computer of said previously requested and retained copy of at least some of said actually requested next-level additional network information resources.

96. The method of claim 95 carried out for at least two iterations.

97. The method of claim 92, comprising the additional steps of:
   h. upon the specification of a second selection of information by said operator requesting said second selection from the network if not already requested; and,
   i. requesting, if possible, the network to delay the delivery of other requested information in favor of the information specified in said second selection.

98. The method of claim 92, wherein prior to step d., a choice is made of which of said additional selections of network-obtainable information are to be requested via said network based upon user-specified criteria.

99. The method of claim 92, wherein prior to step d., the choice of which of said additional selections of network-obtainable information are to be requested via said network based upon criteria obtained from analysis of a history of prior use of the instant system by said end user.

100. The method of claim 92, wherein prior to step d., a choice is made of which of said additional selections of network-obtainable information are to be requested via said network based upon criteria pertaining to the comparison between the content of at least two documents.

101. The method of claim 92, wherein said information comprises legal information.

102. The method of claim 92, wherein prior to step d., a choice is made of which of said additional selections of network-obtainable information are to be requested via said network based upon the operation of an 'Artificial Intelligence' algorithm.

103. A method as in claim 92, comprising in addition the improvement of:

a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;

b. sequentially transmitting information for at least three levels of progressively finer detail, where each transmission comprises groupings from at least two files, and where the groupings from any one file are ordered in progressively finer levels of detail.

104. A method as in claim 92, comprising in addition the improvement of:

a. transmitting a series of data packets comprising information from a multiplicity of data files, and wherein said data packets are sequenced in a manner such that said information from at least three data files are arranged in an interleaved manner.

105. A method as in claim 92, comprising in addition the improvement of:

a. each of at least three data packets is further divided into at least three sub-packets; and, b. in any one of said at least three data packets, each of said sub-packets comprises a section of content from a distinct one of a multiplicity of data files, and at least three of said at least three data packets comprise content from the same data file.

106. A method as in claim 92, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

107. A method as in claim 92, comprising in addition the improvement of:

a. preforming this method by the operation of an intermediary computer program operating in conjunction with a companion server computer program.

108. A method as in claim 92, comprising in addition the improvement of:

a. preforming this method by the operation of an intermediary computer program operating in conjunction with a companion client computer program.

109. A method as in claim 92, comprising in addition the improvement of:

a. preforming this method by the operation of an intermediary computer program operating in conjunction with both a companion client computer program and a companion server computer program.

110. A method as in claim 12, for transmitting a multiplicity of data files via a packet-switching digital communications network, utilizing a communications protocol wherein the normal mode of operation is to send a data file from a server in response to a request from a client, the requested file being passed along by one or more intermediary computers on said network as a data stream of packets, and wherein said improvement comprises in addition the steps of:

a. the retention by at least one intermediary computer of at least some data files passed along from a server in response to a first client request;

b. the reception by said intermediary of a second client request for the same data file from the same server; and, c. the supplying of said retained copy by said intermediary computer in response to said second client request for the same data file from the same server.

111. A method as in claim 110, wherein the additional steps are performed between steps b. and c. of:

d. the requesting of said server by said intermediary computer, by supplying a date/time said retained data file was obtained, of either: confirmation that the retained copy was obtained subsequent to the date/time that said server's own copy of said data file was last updated; or, an updated copy of said data file; and, e. the updating of said retained copy, if one is returned by said server.

112. A method as in claim 110, wherein the additional steps of:

d. the requesting of said server by said intermediary computer, by supplying a date/time said retained data file was obtained, of either: confirmation that the retained copy was obtained subsequent to the date/time that said server's own copy of said data file was last updated; or, an updated copy of said data file; and, e. the transmission of said updated retained copy, if one is returned by said server.

113. A method as in claim 110, wherein said data files comprise HTTP document elements.

114. The process of claim 110, used in conjunction with a Worldwide Web search engine.

115. A method as in claim 12, for navigating a hypermedia database by an end user using a client computer wherein the improvement comprises the steps of:

a. downloading from said database by said client computer an information resource requested by said end user;

b. repeating for at least one additional level: analyzing current level information resources for references to next-level information resources and downloading at least the components of those next-level information resources that contain further-next-level references;

c. constructing a viewable multi-level, hyper-media representation of those references for display to the end user of said client computer.

116. A method as in claim 115, wherein said data files comprise HTTP document elements.

117. The process of claim 115, used in conjunction with a Worldwide Web search engine.

118. A method as in claim 115, wherein said at least one additional level of step b. is at least three.

119. A method as in claim 12, wherein said first data file comprises the main text element (HTML file) of a first Worldwide Web page, and said at least one additional data file comprises at least one additional Worldwide Web document element belonging to said first Worldwide Web page and is referenced in said first data file.

120. A method as in claim 12, wherein said first data file comprises the main text element (HTML file) of a first Worldwide Web page, and said at least one additional data file comprises at least one additional main text element (HTML file) of at least one additional Worldwide Web page and is referenced in said first data file.

121. The process of claim 120, used in conjunction with a Worldwide Web search engine.

122. A method as in claim 12, wherein said data files comprise HTTP document elements.

123. A method for data communication comprising:
   a. communication between an intermediate computer and a network via a standard communications protocol; and,
   b. communication between said intermediate computer and a receiving computer via said improved method of claim 12.

124. The process of claim 12, used in conjunction with a Worldwide Web search engine.

125. A method as in claim 12, wherein for each of said data files, all data packets of a particular data file are sent before any data packets of a subsequent file are sent.

126. A method as in claim 12, wherein for at least some of said data files, some data packets of a subsequent data file are sent prior to completion of the sending of all of the data packets of a previous file.

127. The method of claim 12, embodied as an enhanced communications protocol.

128. An enhanced communications protocol standard comprising instructions to carry out the method of claim 12.

129. A computer program comprising instructions to carry out the method of claim 12.

130. A method as in claim 12, wherein said at least one additional data file of step d. is at least three.

131. A method as in claim 12, comprising in addition the improvement of:
   a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;
   b. sequentially transmitting information for at least three levels of progressively finer detail, where each transmission comprises groupings from at least two files, and where the groupings from any one file are ordered in progressively finer levels of detail.

132. A method for receiving a data file via a packet-switching digital communications network, transmitted by the method of claim 131 comprising the steps of:
   a. receiving at least one data stream comprising a multiplicity of data packets;
   b. upon receiving information from a first of said groupings comprising information at a first level of detail, creating a first version of said data files at said first level of detail;
   c. making said first version available for display;
   d. upon receiving information from a second of said groupings comprising information at a second level of detail, creating a second version of said data files at said second level of detail;
   e. making said second version available for display;
   f. upon receiving information from a third of said groupings comprising information at a third level of detail, creating a third version of said data files at said third level of detail; and,
   g. making said third version available for display.

133. A method as in claim 132, comprising, in addition, the steps of:
   h. upon receiving information from a fourth of said groupings comprising information at a fourth level of detail, creating a fourth version of said data files at said fourth level of detail; and,
   i. making said fourth version available for display.

134. A method as in claim 12, comprising in addition the improvement of:
   a. organizing each of at least two data files into at least four groupings, each of said groupings comprising information at distinct progressively finer levels of detail, the levels of detail in any of said at least two data files not necessarily corresponding to the levels of detail of any other of said at least two data files, and at least four groupings contain information from each of at least two files;
   b. sequentially transmitting information for at least four levels of progressively finer detail, where each transmission comprises groupings from at least two files, and where the groupings from any one file are ordered in progressively finer levels of detail.

135. A method as in claim 12, comprising in addition the improvement of:
   a. organizing each of at least four data files into at least two groupings, each of said groupings comprising information at distinct progressively finer levels of detail, the levels of detail in any of said at least four data files not necessarily corresponding to the levels of detail of any other of said at least four data files, and at least two groupings contain information from each of at least two files;
   b. sequentially transmitting information for at least two levels of progressively finer detail, where each transmission comprises groupings from at least two files, and where the groupings from any one file are ordered in progressively finer levels of detail.

136. An improved method for transmitting a multiplicity of data files from a first transmitting computer to a second receiving computer, via a packet-switching digital communications network, utilizing a communication protocol employing port addresses corresponding to data streams, wherein the normal mode of operation is to transmit each data file as a data stream of packets separate from the data streams of other data files, wherein the improvement comprises a transmission, of a single data stream comprising a sequence of data packets, comprising at least the steps of:
   a. establishing a data stream connection between said first computer and said second computer;
   b. maintaining in a open state said data stream connection; and,
   c. transmitting via said data stream connection a series of data packets comprising information from a multiplicity of data files, and wherein said data packets are sequenced in a manner such that said information from at least two of said multiplicity of data files are arranged in an interspersed manner.

137. A method as in claim 136, comprising in addition the interspersing of the information from at least two of said multiplicity of data files comprising the steps of transmitting:
   a. a data packet comprising a first section of content from a first data file;
   b. followed by a data packet comprising a first section of content from a second data file; and, c. followed by a data packet comprising a section of content subsequent to said first section of content from said first data file.

138. A method as in claim 137, wherein additional information is transmitted which specifies an association between said data packets and said data files.

139. A method for receiving a multiplicity of data files via a packet-switching digital communications network, transmitted by the method of claim 138 comprising the steps of:
  a. receiving a data stream comprising a multiplicity of data packets;
  b. sorting said data packets into at least two groups of data packets corresponding to at least two of said data files, said sorting being accomplished in accordance with said additional information; and,
  c. re-assembling from said at least two groups of data packets said at least two data files.

140. A method as in claim 139, wherein said at least two groups is at least four, and said at least two of said data files (steps b. and c.) is at least four.

141. A method as in claim 137, wherein said data files comprise HTTP document elements.

142. A method for data communication comprising:
  a. communication between an intermediate computer and a network via a standard communications protocol; and,
  b. communication between said intermediate computer and a receiving computer via said improved method of claim 137.

143. The process of claim 137, used in conjunction with a Worldwide Web search engine.

144. A method as in claim 137, comprising in addition the improvement of:
  a. individually specifying the amount other than a default amount of transmission bandwidth dedicated to at least one of a multiplicity of data files to be simultaneously transmitted by associating a set of transmission weights to the set of files being simultaneously transmitted;
  b. transmitting said multiplicity of data files; and,
  c. individually adjusting the amount of transmission bandwidth dedicated to said at least one of said multiplicity of data files in accordance with said set of transmission weights.

145. A method as in claim 137, comprising, in addition, between step b. and step c. the steps of:
  b1. followed by a data packet comprising a first section of content from a third data file; and,
  b2. followed by a data packet comprising a first section of content from a fourth data file.

146. A method as in claim 136, wherein said data files comprise HTTP document elements.

147. A method for data communication comprising:
  a. communication between an intermediate computer and a network via a standard communications protocol; and,
  b. communication between said intermediate computer and a receiving computer via said improved method of claim 136.

148. The process of claim 136, used in conjunction with a Worldwide Web search engine.

149. A method as in claim 136, wherein each of said data packets comprises data from only one of said data files.

150. A method as in claim 136, wherein at least some of said data packets comprise data from a multiplicity of said data files.

151. A method as in claim 136, comprising in addition the interspersing of the information from at least two of said multiplicity of data files comprising the steps of transmitting at least one data packet wherein:
  a. each of said at least one data packet is further divided into at least two sub-packets;
  b. each of said sub-packets comprises a section of content from one of said multiplicity of data files;
  c. a first such sub-packet comprises a content section from a first data file; and,
  d. a second such sub-packet comprises a content section from a second data file distinct from said first data file.

152. A method as in claim 151, wherein additional information is transmitted which specifies an association between said data sub-packets and said data files.

153. A method for receiving a multiplicity of data files via a packet-switching digital communications network, transmitted by the method of claim 152 comprising the steps of:
  a. receiving a data stream comprising at least one data packet comprising a multiplicity of sub-packets;
  b. sorting said sub-packets into at least two groups of sub-packets corresponding to at least two of said data files, said sorting being accomplished in accordance said additional information; and,
  c. re-assembling from said at least two groups of sub-packets said at least two data files.

154. A method as in claim 153, wherein said at least two groups is at least four, and said at least two of said data files (steps b. and c.) is at least four.

155. A method as in claim 153, wherein said at least one data packet of step a. is at least three data packets.

156. A method as in claim 151, wherein said data files comprise HTTP document elements.

157. A method for data communication comprising:
  a. communication between an intermediate computer and a network via a standard communications protocol; and,
  b. communication between said intermediate computer and a receiving computer via said improved method of claim 151.

158. The process of claim 151, used in conjunction with a Worldwide Web search engine.

159. A method as in claim 151, comprising in addition the improvement of:
  a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;
  b. sequentially transmitting information for at least three levels of progressively finer detail, where each transmission comprises groupings from at least two files, and where the groupings from any one file are ordered in progressively finer levels of detail.

160. A method as in claim 151, comprising in addition the improvement of:
  a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

161. A method as in claim 151, wherein said at least one data packet recited in the preamble is at least three, and said data packet of step a. is each of said at least three data packets.

162. A method as in claim 151, wherein said at least two sub-packets of step a. is at least four, and the contents of each of said sub-packets in a particular packet are derived from a distinct one of said data files.

163. The method of claim 136 embodied as an enhanced communications protocol.

164. An enhanced communications protocol standard comprising instructions to carry out the method of claim 136.

165. A computer program comprising instructions to carry out the method of claim 136.

166. A method as in claim 136, comprising in addition the improvement of:

a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;

b. sequentially transmitting information for at least three levels of progressively finer detail, where each transmission comprises groupings from at least two files, and where the groupings from any one file are ordered in progressively finer levels of detail.

167. A method as in claim 136, comprising in addition the improvement of:

a. individually specifying the amount other than a default amount of transmission bandwidth dedicated to at least one of a multiplicity of data files to be simultaneously transmitted by associating a set of transmission weights to the set of files being simultaneously transmitted;

b. transmitting said multiplicity of data files; and, c. individually adjusting the amount of transmission bandwidth dedicated to said at least one of said multiplicity of data files in accordance with said set of transmission weights.

168. A method as in claim 136, wherein said at least two of said multiplicity of data files of step c. is at least four.

169. A method for transmitting a multiplicity of data files from a first transmitting computer to a second receiving computer, via a packet-switching digital communications network, utilizing a communications protocol wherein the normal mode of operation is to transmit each data file as a data stream of packets separate from the data streams of other data files and to, when transmitting multiple data files simultaneously, transmit each at a bandwidth independent of end user need, and wherein said improvement comprises the steps of:

a. establishing a data stream connection between said first computer and said second computer;

b. maintaining in a open state said data stream connection;

c. transmitting via said data stream connection a series of data packets comprising information from a multiplicity of data files, wherein said data packets are sequenced in a manner such that said information from at least two of said multiplicity of data files are arranged in an interspersed manner;

d. individually specifying the amount other than a default amount of transmission bandwidth dedicated to at least one of said multiplicity of data files to be simultaneously transmitted by associating a set of transmission weights to the set of files being simultaneously transmitted;

e. transmitting said multiplicity of data files; and, f. individually adjusting the amount of transmission bandwidth dedicated to said at least one of said multiplicity of data files in accordance with said set of transmission weights.

170. A method as in claim 169, wherein said transmission weights are a function of the sizes of said data files.

171. A method as in claim 169, wherein said transmission weights are a function of the types of said data files.

172. A method as in claim 169, wherein said transmission weights are a function of the 'importance specification' of said data files.

173. A method as in claim 169, wherein said transmission weights are a function of the measures of the probability that each data file will be requested or needed by the end user.

174. A method as in claim 173, wherein said digital communications network is the Internet and said communications protocol is HTTP and said data files are components of Worldwide Web documents.

175. The process of claim 173, used in conjunction with a Worldwide Web search engine.

176. A method as in claim 169, wherein said transmission weights are a function of 'priority specifications' supplied by the end user.

177. A method as in claim 169, wherein said transmission weights are a function of 'priority specifications' supplied by a client system.

178. A method as in claim 169, wherein said transmission weights are dynamically adjusted.

179. A method as in claim 169, wherein said transmission weights are dynamically adjusted in correspondence to a change in which document is being viewed by the end user of a client computer.

180. A method as in claim 169, wherein said amount of transmission bandwidth is adjusted by varying the size of packets sent for individual data files.

181. A method as in claim 169, wherein said amount of transmission bandwidth is adjusted by varying the frequency of packets sent for individual data files.

182. A method as in claim 169, wherein said digital communications network is the Internet and said communications protocol is HTTP and said data files are components of Worldwide Web documents.

183. A method for requesting the transmission of a multiplicity of data files, to be transmitted by the method of claim 169 comprising the step of:

the transmission from a client program of transmission weights associated with information requests.

184. A method as in claim 183, wherein said transmission weights are a function of the measures of the probability that each data file will be requested or needed by the end user.

185. A method as in claim 183, wherein said transmission weights are dynamically adjusted.

186. A method as in claim 183, wherein said transmission weights are dynamically adjusted in correspondence to a change in which document is being viewed by the end user of a client computer.

187. A method for data communication comprising:

a. communication between an intermediate computer and a network via a standard communications protocol; and, b. communication between said intermediate computer and a receiving computer via said improved method of claim 169.

188. A method as in claim 169, wherein said transmission weights are a calculated as function of the operation of an 'Artificial Intelligence' algorithm.

189. The process of claim 188, used in conjunction with a Worldwide Web search engine.

190. The process of claim 169, used in conjunction with a Worldwide Web search engine.

191. The method of claim 169 embodied as an enhanced communications protocol.

192. An enhanced communications protocol standard comprising instructions to carry out the method of claim 169.

193. A computer program comprising instructions to carry out the method of claim 169.

194. A method as in claim 169, comprising in addition the improvement of:
  a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;
  b. sequentially transmitting information for at least three levels of progressively finer detail, where each transmission comprises groupings from at least two files, and where the groupings from any one file are ordered in progressively finer levels of detail.

195. A method as in claim 169, comprising in addition the improvement of:
  a. transmitting a series of data packets comprising information from a multiplicity of data files, and wherein said data packets are sequenced in a manner such that said information from at least three data files are arranged in an interleaved manner.

196. A method as in claim 169, comprising in addition the improvement of:
  a. each of at least three data packets is further divided into at least three sub-packets; and,
  b. in any one of said at least three data packets, each of said sub-packets comprises a section of content from a distinct one of a multiplicity of data files, and at least three of said at least three data packets comprise content from the same data file.

197. A method as in claim 169, wherein said at least one of said multiplicity of data files in step d., is exactly one.

198. A method as in claim 169, wherein said at least one of said multiplicity of data files in step d., is at least two.

199. A method as in claim 169, wherein said at least one of said multiplicity of data files in step d., is at least four.

200. An improved method for transmitting a multiplicity of data files from a first transmitting computer to a second receiving computer, via a packet-switching digital communications network, utilizing a communications protocol employing port addresses corresponding to data streams, wherein the normal mode of operation is to transmit each data file as a data stream of packets separate from the data streams of other data files, wherein the improvement comprises a transmission, of a single data stream comprising a sequence of data packets, comprising at least the steps of:
  a. establishing a data stream connection between said first computer and said second computer;
  b. maintaining in a open state said data stream connection;
  c. transmitting via said data stream connection a series of data packets comprising information from a multiplicity of data files; and,
  d. for at least some packet switching network packet, insinuating an additional multi-thread packet header into said packet switching packet.

201. A method as in claim 200, wherein said data packets are divided into sub-packets and said multi-thread packet header specifies an association between said data files and said sub-packets.

202. A method as in claim 201, wherein said data files comprise HTTP document elements.

203. A method as in claim 200, wherein said data packets each comprise file content data from at most one of said data files.

204. A method as in claim 203, wherein said data files comprise HTTP document elements.

205. The method of claim 200 embodied as an enhanced communications protocol.

206. An enhanced communications protocol standard comprising instructions to carry out the method of claim 200.

207. A computer program comprising instructions to carry out the method of claim 200.

208. A method as in claim 200, comprising in addition the improvement of:
  a. organizing each of at least three data files into at least three groupings, each of said groupings comprising information at distinct progressively finer levels of detail, the levels of detail in any of said at least three data files not necessarily corresponding to the levels of detail of any other of said at least three data files, and where it is required that at least three groupings comprise information from the same file, and at least three groupings contain information from each of at least two files;
  b. sequentially transmitting information for at least three levels of progressively finer detail, where each transmission comprises groupings from at least two files, and where the groupings from any one file are ordered in progressively finer levels of detail.

209. A method as in claim 200, comprising in addition the improvement of:
  a. each of at least three data packets is further divided into at least three sub-packets; and,
  b. in any one of said at least three data packets, each of said sub-packets comprises a section of content from a distinct one of a multiplicity of data files, and at least three of said at least three data packets comprise content from the same data file.

210. A method as in claim 200, comprising in addition the improvement of:
  a. individually specifying the amount other than a default amount of transmission bandwidth dedicated to at least one of a multiplicity of data files to be simultaneously transmitted by associating a set of transmission weights to the set of files being simultaneously transmitted;
  b. transmitting said multiplicity of data files; and,
  c. individually adjusting the amount of transmission bandwidth dedicated to said at least one of said multiplicity of data files in accordance with said set of transmission weights.

* * * * *